US010726413B2

(12) United States Patent
Basu et al.

(10) Patent No.: US 10,726,413 B2
(45) Date of Patent: Jul. 28, 2020

(54) SECURING EXTERNAL SYSTEMS WITH ACCOUNT TOKEN SUBSTITUTION

(71) Applicant: Visa International Service Association, San Francisco, CA (US)

(72) Inventors: Gourab Basu, Half Moon Bay, CA (US); Michael Mori, San Mateo, CA (US); Ross Sakata, Foster City, CA (US); Steven Cracknell, San Mateo, CA (US); Millie Yee, Santa Clara, CA (US); Mark Carlson, Half Moon Bay, CA (US); Patrick Stan, Pacifica, CA (US); Surendra Keshan, Cupertino, CA (US); Edward Katzin, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 961 days.

(21) Appl. No.: 15/095,984

(22) Filed: Apr. 11, 2016

(65) Prior Publication Data
US 2016/0224976 A1 Aug. 4, 2016

Related U.S. Application Data

(62) Division of application No. 13/208,733, filed on Aug. 12, 2011, now Pat. No. 9,342,832.
(Continued)

(51) Int. Cl.
*G06Q 20/02* (2012.01)
*G06Q 20/36* (2012.01)
(Continued)

(52) U.S. Cl.
CPC ......... *G06Q 20/3672* (2013.01); *G06Q 20/02* (2013.01); *G06Q 20/12* (2013.01);
(Continued)

(58) Field of Classification Search
CPC .. G06Q 20/385; G06Q 20/4016; G06Q 20/02; G06Q 20/12; G06Q 20/322;
(Continued)

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

EP 2156397 A1 2/2010
WO 0109855 2/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Steven S Kim
(74) *Attorney, Agent, or Firm* — Kilpatrick Townsend & Stockton LLP

(57) ABSTRACT

Systems, apparatuses, and methods for providing an account token to an external entity during the lifecycle of a payment transaction. In some embodiments, an external entity may be a merchant computer requesting authorization of a payment message. In other embodiments, the external entity may be a support computer providing a payment processing network or a merchant support functions.

11 Claims, 12 Drawing Sheets

Related U.S. Application Data

(60) Provisional application No. 61/373,163, filed on Aug. 12, 2010, provisional application No. 61/381,322, filed on Sep. 9, 2010.

(51) Int. Cl.
  *G06Q 20/38* (2012.01)
  *G06Q 20/12* (2012.01)
  *G06Q 20/32* (2012.01)
  *G06Q 20/40* (2012.01)

(52) U.S. Cl.
  CPC ....... *G06Q 20/322* (2013.01); *G06Q 20/3674* (2013.01); *G06Q 20/382* (2013.01); *G06Q 20/385* (2013.01); *G06Q 20/38215* (2013.01); *G06Q 20/4016* (2013.01); *G06Q 2220/00* (2013.01)

(58) Field of Classification Search
  CPC ............. G06Q 20/3674; G06Q 20/382; G06Q 20/38215; G06Q 20/3672; G06Q 2220/00
  See application file for complete search history.

(56) References Cited

U.S. PATENT DOCUMENTS

| | | |
|---|---|---|
| 5,883,810 A | 3/1999 | Franklin et al. |
| 5,903,652 A | 5/1999 | Mital |
| 5,903,880 A | 5/1999 | Biffar |
| 5,953,710 A | 9/1999 | Fleming |
| 5,956,699 A | 9/1999 | Wong et al. |
| 6,000,832 A | 12/1999 | Franklin et al. |
| 6,005,945 A | 12/1999 | Whitehouse |
| 6,014,635 A | 1/2000 | Harris et al. |
| 6,044,360 A | 3/2000 | Picciallo |
| 6,163,771 A | 12/2000 | Walker et al. |
| 6,182,894 B1 | 2/2001 | Hackett |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,658,393 B1 * | 12/2003 | Basch ................. G06Q 20/341 705/35 |
| 6,745,936 B1 | 6/2004 | Movalli |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,961,858 B2 | 11/2005 | Fransdonk |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,020,635 B2 | 3/2006 | Hamilton et al. |
| 7,032,168 B1 | 4/2006 | Gerace |
| 7,051,929 B2 | 5/2006 | Li |
| 7,069,249 B2 | 6/2006 | Stolfo et al. |
| 7,080,049 B2 | 7/2006 | Truitt et al. |
| 7,090,128 B2 | 8/2006 | Farley et al. |
| 7,103,576 B2 | 9/2006 | Mann, III et al. |
| 7,107,462 B2 | 9/2006 | Fransdonk |
| 7,113,930 B2 | 9/2006 | Eccles et al. |
| 7,136,835 B1 | 11/2006 | Flitcroft et al. |
| 7,150,045 B2 | 12/2006 | Koelle et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,403,922 B1 | 7/2008 | Lewis et al. |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,603,382 B2 | 10/2009 | Halt |
| 7,606,560 B2 | 10/2009 | Labrou et al. |
| 7,620,606 B2 | 11/2009 | Gentry et al. |
| 7,627,531 B2 | 12/2009 | Breck et al. |
| 7,627,895 B2 | 12/2009 | Gifford et al. |
| 7,650,314 B1 | 1/2010 | Saunders |
| 7,664,701 B2 | 2/2010 | Phillips |
| 7,685,037 B2 | 3/2010 | Reiners et al. |
| 7,685,067 B1 * | 3/2010 | Britto ................. G06Q 20/10 235/379 |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,757,298 B2 | 7/2010 | Shuster |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,941,370 B2 * | 5/2011 | Paulsen ................. G06Q 20/02 705/1.1 |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,083,137 B2 | 12/2011 | Tannenbaum |
| 8,095,113 B2 | 1/2012 | Kean et al. |
| 8,104,679 B2 | 1/2012 | Brown |

(56) References Cited

U.S. PATENT DOCUMENTS

| | | | |
|---|---|---|---|
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,170,922 B2 | 5/2012 | Cavagnaro |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,381,213 B1 | 2/2013 | Naamad et al. |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,528,067 B2 * | 9/2013 | Hurry | G06Q 20/3552 726/9 |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,571,980 B1 * | 10/2013 | Greenwood | G06Q 40/02 705/39 |
| 8,571,995 B2 | 10/2013 | Spies |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,342,832 B2 | 5/2016 | Basu |
| 9,530,137 B2 | 12/2016 | Weiss |
| 10,089,683 B2 * | 10/2018 | Dominguez | G06Q 20/40 |
| 2001/0029485 A1 | 10/2001 | Brody et al. |
| 2001/0032878 A1 | 10/2001 | Tsiounis et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0059114 A1 * | 5/2002 | Cockrill | G06Q 20/04 705/26.81 |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0143987 A1 * | 10/2002 | Sadler | H04L 63/0823 709/238 |
| 2002/0147913 A1 | 10/2002 | Lun Yip |
| 2002/0194119 A1 * | 12/2002 | Wright | G06Q 20/04 705/38 |
| 2003/0028481 A1 | 2/2003 | Flitcroft et al. |
| 2003/0126094 A1 * | 7/2003 | Fisher | G06Q 20/02 705/75 |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0073688 A1 | 4/2004 | Sampson |
| 2004/0093281 A1 | 5/2004 | Silverstein et al. |
| 2004/0107170 A1 | 6/2004 | Labrou et al. |
| 2004/0139008 A1 | 7/2004 | Mascavage, III |
| 2004/0143532 A1 | 7/2004 | Lee |
| 2004/0143552 A1 | 7/2004 | Weichert et al. |
| 2004/0158532 A1 | 8/2004 | Breck et al. |
| 2004/0210449 A1 | 10/2004 | Breck et al. |
| 2004/0210498 A1 | 10/2004 | Freund |
| 2004/0225473 A1 * | 11/2004 | Aoki | G06Q 20/40 702/181 |
| 2004/0232225 A1 | 11/2004 | Bishop et al. |
| 2004/0260646 A1 | 12/2004 | Berardi et al. |
| 2005/0027543 A1 | 2/2005 | Labrou et al. |
| 2005/0027648 A1 * | 2/2005 | Knowles | G06Q 20/04 705/38 |
| 2005/0037735 A1 | 2/2005 | Coutts |
| 2005/0080730 A1 | 4/2005 | Sorrentino |
| 2005/0108178 A1 | 5/2005 | York |
| 2005/0149455 A1 * | 7/2005 | Bruesewitz | G06Q 20/04 705/64 |
| 2005/0187873 A1 | 8/2005 | Labrou et al. |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0123465 A1 | 6/2006 | Ziegler |
| 2006/0167819 A1 | 7/2006 | Bhambri et al. |
| 2006/0235795 A1 | 10/2006 | Johnson et al. |
| 2006/0237528 A1 | 10/2006 | Bishop et al. |
| 2006/0277148 A1 | 12/2006 | Thackston |
| 2006/0278704 A1 | 12/2006 | Saunders et al. |
| 2007/0022058 A1 | 1/2007 | Labrou et al. |

(56) References Cited

U.S. PATENT DOCUMENTS

| | | |
|---|---|---|
| 2007/0050635 A1 | 3/2007 | Popp |
| 2007/0107044 A1 | 5/2007 | Yuen et al. |
| 2007/0125840 A1 | 6/2007 | Law et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0192245 A1 | 8/2007 | Fisher |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2007/0294539 A1 | 12/2007 | Shulman |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0091617 A1 | 4/2008 | Hazel et al. |
| 2008/0091944 A1 | 4/2008 | Von Mueller et al. |
| 2008/0103982 A1 | 5/2008 | Hammad et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0288382 A1* | 11/2008 | Smith .................... G06Q 40/00 705/35 |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0024908 A1 | 1/2009 | Kottke et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0070583 A1 | 3/2009 | Von Mueller et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0228714 A1 | 9/2009 | Fiske et al. |
| 2009/0248581 A1 | 10/2009 | Brown |
| 2009/0248583 A1 | 10/2009 | Chhabra |
| 2009/0249082 A1 | 10/2009 | Mattsson |
| 2009/0254440 A1 | 10/2009 | Pharris |
| 2009/0276347 A1 | 11/2009 | Kargman |
| 2009/0281948 A1 | 11/2009 | Carlson |
| 2009/0288012 A1 | 11/2009 | Hertel et al. |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0319638 A1* | 12/2009 | Faith .................... G06Q 30/06 709/219 |
| 2009/0327131 A1 | 12/2009 | Beenau et al. |
| 2010/0008535 A1 | 1/2010 | Abulafia et al. |
| 2010/0088204 A1* | 4/2010 | Nambiar ............ G06Q 20/04 705/30 |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0257612 A1 | 10/2010 | McGuire et al. |
| 2010/0258620 A1 | 10/2010 | Torreyson et al. |
| 2010/0268696 A1* | 10/2010 | Nightengale ..... G06F 16/24573 707/694 |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0318468 A1 | 12/2010 | Carr |
| 2010/0325041 A1 | 12/2010 | Berardi et al. |
| 2010/0327054 A1 | 12/2010 | Hammad |
| 2011/0010292 A1 | 1/2011 | Giordano et al. |
| 2011/0016047 A1 | 1/2011 | Wu et al. |
| 2011/0016052 A1* | 1/2011 | Scragg .................... G06Q 20/02 705/44 |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0106710 A1 | 5/2011 | Reed et al. |
| 2011/0125597 A1 | 5/2011 | Oder, II et al. |
| 2011/0126274 A1 | 5/2011 | Sadeckas |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0154467 A1 | 6/2011 | Bomar et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0213807 A1 | 9/2011 | Mattsson |
| 2011/0238511 A1 | 9/2011 | Park et al. |
| 2011/0238573 A1 | 9/2011 | Varadarajan |
| 2011/0238575 A1* | 9/2011 | Nightengale .......... G06Q 20/20 705/44 |
| 2011/0246317 A1 | 10/2011 | Coppinger |
| 2011/0246369 A1 | 10/2011 | De Oliveira et al. |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0276489 A1* | 11/2011 | Larkin .................... G06Q 20/20 705/44 |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0136789 A1 | 5/2012 | Kendrick |
| 2012/0143767 A1 | 6/2012 | Abadir |
| 2012/0143772 A1 | 6/2012 | Abadir |
| 2012/0158580 A1 | 6/2012 | Eram et al. |

(56) References Cited

U.S. PATENT DOCUMENTS

| | | |
|---|---|---|
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |

(56) References Cited

U.S. PATENT DOCUMENTS

| | | |
|---|---|---|
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Ulf Mattsson, "The Difference Between Tokenization and Encryption", Nov. 7, 2011.
Notice of Allowance dated Jan. 12, 2016, U.S. Appl. No. 13/208,733, 19 pages.
Final Office Action dated Mar. 28, 2013, U.S. Appl. No. 13/208,733, 17 pages.
Non-final Office Action dated Aug. 31, 2012, U.S. Appl. No. 13/208,733, 29.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.

* cited by examiner

SECURING EXTERNAL SYSTEMS WITH ACCOUNT TOKEN SUBSTITUTION

CROSS-REFERENCES TO RELATED APPLICATIONS

This application is a divisional application of U.S. application Ser. No. 13/208,733, filed Aug. 12, 2011 and claims the benefit of U.S. Provisional Application No. 61/373,163, filed Aug. 12, 2010, entitled "SECURING SECONDARY SYSTEMS WITH TOKEN PAN SUBSTITUTION," and U.S. Provisional Application No. 61/381,322, filed Sep. 9, 2010, entitled "ACCOUNT NUMBER TOKENIZATION," which are herein incorporated by reference in their entirety for all purposes.

BACKGROUND

As methods and devices for engaging in financial transactions have increased, old problems of protecting sensitive information persist. For example, one common source of fraud occurs when a hacker gains access to a data center and obtains sensitive information such as credit card numbers and other cardholder data. As another example, an employee entrusted to maintain sensitive information can provide a fraudster access to the cardholder data, either by voluntary act, trick, negligence, or accident.

To protect sensitive information from such fraud, a data center may encrypt the data it stores. For example, a merchant may wish to track financial transactions at one or more stores to gain insight on the purchasing tendencies of its customers. In this example, the merchant may store financial information (e.g., credit card numbers) associated with the purchases. However, because such information is sensitive and could be used to conduct fraudulent transactions, the merchant may secure the credit card numbers it collects by encrypting the credit numbers it stores in its data center.

A merchant processor that performs payment gateway services on behalf of a merchant is another example of a data center. For example, the merchant processor (as provided by CYBERSOURCE™, of Mountain View, Calif.), may receive payment information from a merchant computer, process the payment information into the format of an authorization request message, send the authorization request message to the appropriate payment processing network (as may be offered by VISA™), receive an authorization response message, and route the authorization response message back to the merchant computer so that the merchant can provide a good or service to a customer.

Other examples of data centers include acquirers and acquirer processors. An acquirer is typically a business entity (e.g., a commercial bank) that has a business relationship with a particular merchant. Acquirers may facilitate and manage financial transactions on behalf of merchants. An acquirer processor is typically a transaction processing entity that has a business relationship with a particular acquirer. Acquirer processors may provide merchants with transaction clearing, settlement, billing and reporting services.

In addition to the payment services described above, the acquirer or acquirer processor can also provide a variety of financial reports to the merchants registered for its services. For example, once a transaction has completed, the merchant may request information specifically for that transaction by sending a report request message to the acquirer or acquirer processor. The acquirer or acquirer processor may respond to the report request message by sending full payment information related to the specified transaction to the merchant.

To provide full payment information back to the merchant as part of these financial reports, the acquirer or acquirer processor may store the credit card numbers involved in the transactions. Accordingly, the acquirer or acquirer processor can be a form of a data center that stores cardholder information and other sensitive information. For the reasons described above, the acquirer or acquirer processor may protect the cardholder information against potential fraudsters. In one approach, the acquirer or acquirer processor may encrypt the credit card numbers that it receives. Further, to avoid collisions between the credit card numbers, the acquirer or acquirer processor may use an encryption key specific to each merchant when the acquirer or acquirer processor encrypts an account number, for example.

When a data center (e.g., a merchant processor, merchant, acquirer processor, or acquirer) maintains a database of sensitive information, the data center may have to comply with a number regulations. Such regulations attempt to increase controls around cardholder data to reduce credit card fraud via its exposure. For example, the Payment Card Industry Data Security Standard (PCI DSS) is an information security standard for organizations that handle cardholder information for the major debit, credit, prepaid, e-purse, ATM, and POS cards. As part of the PCI DSS, a data center that stores and/or processes cardholder information must ensure that the cardholder data is secured. Further, the data center must perform periodic compliance testing.

As described above, a data center may encrypt cardholder information to comply with the PCI DSS. There are many known methods of encryption. Comparatively secure encryption systems are typically expensive and may consume large portions of a computer system's processing bandwidth.

Embodiments of the invention address the above problems, and other problems, individually and collectively.

SUMMARY

Embodiments of the present invention can be directed to systems, apparatuses, and methods for providing account tokens to external systems during the lifecycle of a payment transaction. As is explained below, an account token is a less sensitive form of an account identifier. Such account tokens can be sent to external entities, such as a merchant or a support computer, during the lifecycle of a transaction.

Some embodiments are directed to a method for providing an account token to a merchant computer. The method may involve a tokenization server receiving an authorization request message sent by a merchant computer. The authorization request message may request authorization for payment of a good or service and may include an account identifier and a merchant verification value. A token derivation key is then selected using the merchant verification value. The tokenization server then uses the token derivation key to generate the account token of the account identifier. The account token is inserted in an authorization response message that is then sent to the merchant computer.

Some embodiments are directed to a server that provides an account token to a merchant computer. The server receives an authorization request message sent by a merchant computer. The authorization request message includes an account identifier and a merchant verification value. The server then selects a token derivation key using the merchant verification value. The server then uses the token derivation key to generate the account token of the account identifier. The account token is inserted in an authorization response message that is then sent to the merchant computer.

Some embodiments are directed to a computer readable medium for performing a method of providing an account token to a merchant computer. The method may involve a tokenization server receiving an authorization request message sent by a merchant computer. The authorization request message includes an account identifier and a merchant verification value. A token derivation key is then selected using the merchant verification value. The tokenization server then uses the token derivation key to generate the account token of the account identifier. The account token is inserted in an authorization response message that is then sent to the merchant computer.

Some embodiments are directed to a method for providing an account token to an external entity. The method may involve receiving a payment message that is associated with an account identifier. Then a tokenization server generates an account token of the account identifier associated with the payment message. An external request message with the account token is then transmitted to an external entity. An example of an external entity is a support computer that provides a risk score for a transaction. An external response message is then received. An example of an external response message is a risk score that corresponds to the payment message. After the external response message is received, the account identifier is then determined from the account token.

Some embodiments are directed to a server that provides an account token to an external entity. The server may receive a payment message that is associated with an account identifier. The server then generates an account token of the account identifier associated with the payment message. An external request message with the account token is then transmitted by the server to an external entity. An example of an external entity is a support computer that provides a risk score for a transaction. An external response message is then received by the server. An example of an external response message is a risk score that corresponds to the payment message. After the external response message is received, the account identifier is then determined from the account token.

Some embodiments are directed to a computer readable medium that includes instructions that, when executed by a processor, performs a method for providing an account token to an external entity. The method may involve receiving a payment message that is associated with an account identifier. Then a tokenization server generates an account token of the account identifier associated with the payment message. An external request message with the account token is then transmitted to an external entity. An example of an external entity is a support computer that provides a risk score for a transaction. An external response message is then received. An example of an external response message is a risk score that corresponds to the payment message. After the external response message is received, the account identifier is then determined from the account token.

DETAILED DESCRIPTION

Figure 1:
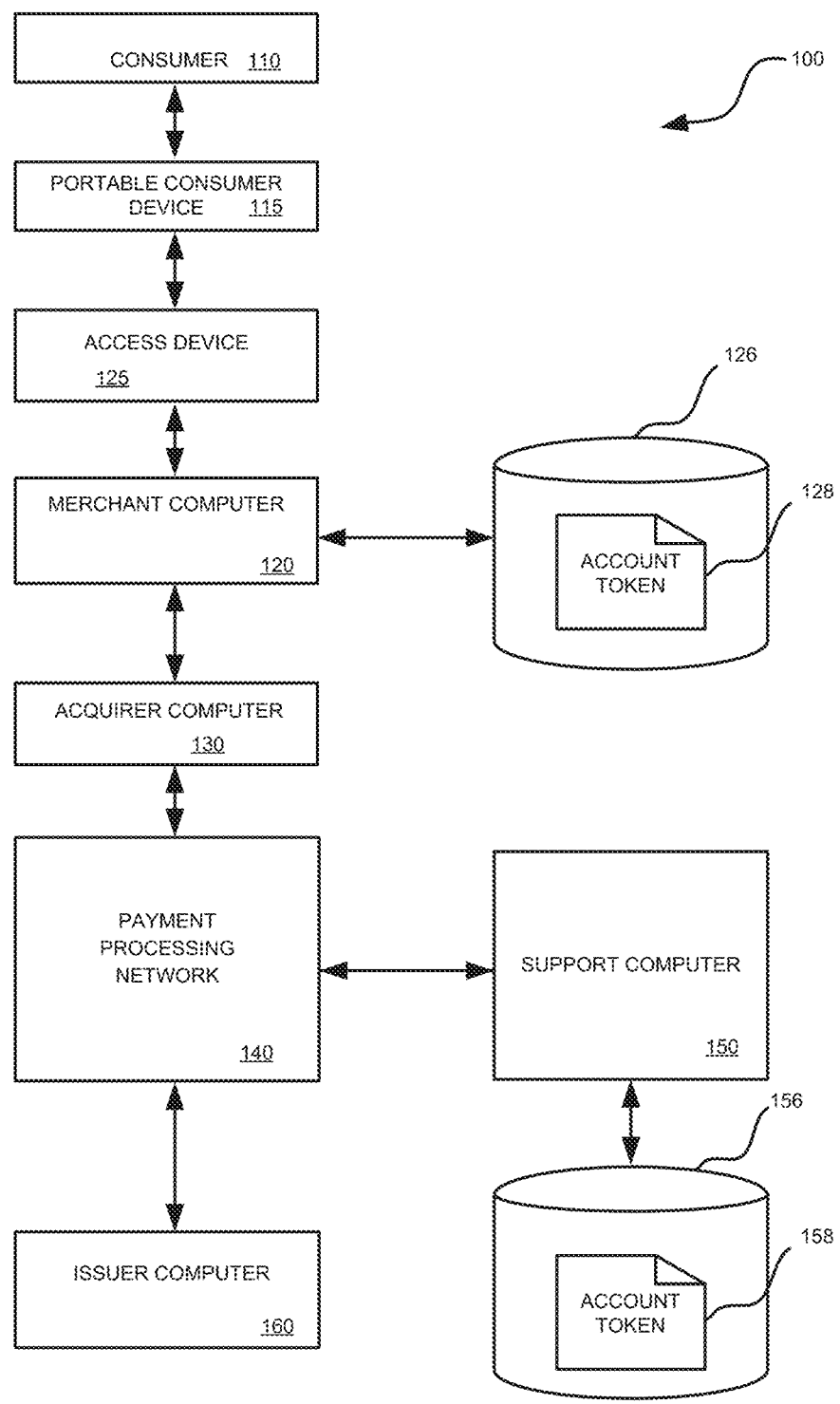
FIG. 1 is a block diagram of a system that uses account tokens, according to example embodiments.

Embodiments of the invention relate to methods and systems for mitigating risks associated with transmitting and storing sensitive account identifiers. Particularly, example embodiments of the invention relate to generating an account token at a payment processing network as part of an authorization process involving a merchant computer, an acquirer computer, and/or a support computer.

However, prior to discussing the example embodiments of the invention, a further description of some terms can be provided for a better understanding of embodiments of the invention.

As used herein, an "account identifier" can refer to any information that identifies an account that holds value for a user. An account identifier can be represented as a sequence of characters or symbols. An account identifier is typically provided as part of a transaction, such as a payment transaction, that credits value to the account, debits value to the account, or performs any other suitable action on the account. Credit card numbers, checking and saving account numbers, prepaid account numbers, aliases and/or a passwords, phone numbers, and any other suitable identifier are all examples of account identifiers.

As used herein, an "account token" can refer to the result of transforming an account identifier into a form that is not considered sensitive in the context of the environment in which the account token resides. A "tokenization algorithm" can refer to the sequence of steps used to transform an account identifier into an account token. Still further, a "reverse tokenization algorithm" can refer to the sequence of steps used to transform the account token back to the account identifier. The tokenization algorithm may replace sensitive data, or portions thereof, with a value that is not considered sensitive.

As used herein, a "token derivation key" can refer to any piece of information that is used as a parameter of a tokenization algorithm. The token derivation key can be used to vary the output of a tokenization algorithm. In some embodiments, a token derivation key is symmetric as the same token derivation key is used for both tokenization and reverse tokenization. In other embodiments, a token derivation key is asymmetric as the token derivation key used to tokenize an account identifier is not used in the reverse tokenization algorithm. Instead, a second token derivation key is used in the reverse tokenization.

An "authorization request message" can refer to a message, or sequence of messages, that requests an issuer of the payment card to authorize a transaction. An authorization request message according to an embodiment of the invention may comply with ISO (International Organization for Standardization) 8583, which is a standard for systems that exchange electronic transactions made by cardholders using payment cards. An authorization request message according to other embodiments may comply with other suitable standards.

An "authorization response message" can refer to a message, or sequence of messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. An authorization response message according to other embodiments may comply with other suitable standards.

A "merchant verification value" may refer to any information that identifies a merchant as a participant in a service or program. As an example, a merchant verification value may be assigned to a business, person, or organization that has agreed to accept payment cards when properly presented by the cardholder. A merchant verification value can be any combination of characters and/or symbols. Further, a merchant verification value can be transmitted to a payment processing network as part of an authorization request message.

A "support system verification value" may refer to any information that identifies a support system as a provider of a service or program. As an example, a support system verification value may be assigned to a web service that provides a fraud score for a transaction. As another example, a support system verification value can be assigned to an alert web service that sends a message to a consumer's communication device (e.g., mobile phone) when one or more conditions applied. Such a message can be for a coupon or an alert that a transaction or activity has occurred with regard to a particular account. A support system verification value can be any combination of characters and/or symbols. Further, in some embodiments, a support system verification value can be transmitted to a payment processing network as part of an authorization request message.

A "verification value," as used herein, can refer to a merchant verification value, a support system verification value, or some combination thereof.

Generally, embodiments relate to apparatuses, systems, and methods of securing sensitive data. In particular, some embodiments improve security of a data center that stores, for example, account identifiers by communicating account tokens from a tokenization server to external entities (e.g., merchant computers or a support computers). Further, in some embodiments, the account tokens communicated to the external entity is generated specific for the external entity. For example, when a merchant is enrolled with a tokenization service, the merchant is assigned a merchant verification value and token derivation key. Thereafter, subsequent communications between a merchant computer and a tokenization server may cause the tokenization server to generate an account token specific to the merchant by using the assigned token derivation key.

To illustrate, when a consumer swipes a credit card at a merchant's store to purchase an item, a bank associated with the merchant may send an authorization request message with a particular account identifier and the merchant verification value assigned to the merchant to the payment processing network. In generating an authorization response message, a tokenization server associated with the payment processing network may select the token derivation key assigned to the merchant (as may be determined by matching a merchant verification value included in the authorization request message to a previously assigned token derivation key) and then generate an account token of the account identifier using the token derivation key. The account token is then inserted in the authorization response message, which is then sent back to the merchant via the bank.

A similar technique can be used to communicate account tokens to support systems, as is further described below.

By communicating an account token to the merchant, example embodiments can provide comparatively secure communication and comparatively secure storage for sensitive information, such as the cardholder data (e.g., credit card number) and other financial information. For example, if a fraudster hacks into the merchant's systems, the account tokens of the account identifiers stored by the merchant will not be useful to the fraudster because the account tokens can not be used alone to conduct financial transactions. That is, the fraudster will be unable to use the account tokens to perform financial transactions.

In some embodiments, a merchant and/or support system does not have access to the reverse token derivation keys needed to transform the account tokens to the corresponding account identifiers. Instead, a tokenization server stores the reverse token derivation keys. Therefore, the risk of compromised cardholder data is further limited in that a fraudster may have to breach the merchant and/or support system to obtain the account tokens and may also have to breach the tokenization server to obtain the reverse token derivation keys. Furthermore, even if the account tokens are compromised for a particular merchant and/or support system (e.g., if the fraudster obtains both the account tokens and reverse token derivation keys), the account tokens for other merchants and/or support systems may remain inaccessible to the fraudster.

Still further, because an account token is received in the authorization response message in addition to or in lieu of the actual account identifier, the apparatuses, methods, and systems described herein also reduce merchant post-processing efforts needed to support encryption or hashing of the account numbers after the authorization response message is received.

As a further advantage, the merchant can use the tokenized account identifier to conduct customer analytics in lieu of the original card identifier. Once the card account numbers are removed from the merchant's systems (often during or after the daily batch sales draft clearing process), the merchant can retain the tokenized account identifier for future analytics and customer tracking, while simultaneously complying with security standards (such as Payment Card Industry Data Security Standard (PCI DSS)) and reducing risk of damaging data breaches. For example, in order to maximize sales, merchants often have the need to perform customer activity tracking and segmentation/spend analyses using sales history. However, using the account identifier to identify customers requires long-term storage of cardholder account identifiers, potentially leading to increased data breach risk and security standards non-compliance. Embodiments of the invention provide a method to tokenize the account identifier so that it can be used in lieu of the actual account identifier to perform merchant customer analytics.

In another example, embodiments of the invention may facilitate customer analytics that allow merchants to measure velocity of purchases (e.g., if five transactions occur within a relatively short time period over a disperse geographic area). Based on an application observing the account tokens, the merchant may deny selected transactions if the merchant detects a suspicious velocity pattern, even if the transaction is authorized by the payment processing network.

In another example, embodiments of the invention may facilitate customer analytics that allow merchants to measure the velocity of purchases to provide various customer loyalty services. For example, based on an application observing the account tokens, the merchant may provide a benefit to repeat customers (e.g., if a customer purchases the same product on five occasions, the merchant can provide the customer with an additional product at no cost).

I. Exemplary Payment System

Example embodiments are typically implemented in the context of a payment transaction. Therefore, prior to further discussing the use of a tokenization server configured to provide account tokens, a brief description of standard consumer purchases will be presented.

An exemplary system 100 for embodiments of the invention can be seen in FIG. 1. For simplicity of discussion, only one of each component is shown. It is understood, however, that embodiments of the invention may include more than one of each component. In addition, some embodiments of the invention may include fewer than all of the components shown in FIG. 1. Also, the components in FIG. 1 may communicate via any suitable communication medium (including the internet), using any suitable communication protocol.

FIG. 1 shows a system 100 that can be used in an embodiment of the invention. The system 100 includes a merchant computer 120 and an acquirer computer 130 communicatively coupled to the merchant computer 120. In a typical payment transaction, a consumer 110 may purchase goods or services at a merchant associated with the merchant computer 120 using a portable consumer device 115. The acquirer computer 130 can communicate with an issuer computer 160 via a payment processing network 140.

The consumer 110 may be an individual, or an organization such as a business that is capable of purchasing goods or services.

The portable consumer device 115 may be in any suitable form. For example, suitable portable consumer devices can be hand-held and compact so that they can fit into a consumer's wallet and/or pocket (e.g., pocket-sized). The portable consumer device 115 can include a processor, and memory, input devices, and output devices, operatively coupled to the processor. Specific examples of portable consumer devices include cellular or wireless phones, personal digital assistants (PDAs), pagers, portable computers, smart cards, and the like. The portable consumer devices can also be debit devices (e.g., a debit card), credit devices (e.g., a credit card), or stored value devices (e.g., a pre-paid or stored value card).

The payment processing network 140 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization request messages and in some instances also performs clearing services, and a Base II system which performs clearing services in instances when it is not performed by the VIP system.

The payment processing network 140 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 140 may use any suitable wired or wireless network, including the Internet.

The merchant computer 120 may also have, or may receive communications from, an access device 125 that can interact with the portable consumer device 115. The access devices 125 according to embodiments of the invention can be in any suitable form. Examples of access devices include point of sale (POS) devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like.

If the access device 125 is a point of sale terminal, any suitable point of sale terminal may be used including card or phone readers. The card or phone readers may include any suitable contact or contactless mode of operation. For example, exemplary readers can include RF (radio frequency) antennas, magnetic stripe readers, etc, to interact with the portable consumer devices 115.

In a typical purchase transaction, the consumer 110 purchases a good or service at the merchant associated with the merchant computer 120 using the portable consumer device 115 such as a credit card or mobile phone. The consumer's portable consumer device 115 can interact with an access device 125 such as a POS (point of sale) terminal communicatively coupled to the merchant computer 120. For example, the consumer 110 may swipe the credit card through a POS terminal or, in another embodiment, may take a wireless phone and may pass it near a contactless reader in a POS terminal.

An authorization request message may then forwarded by the merchant computer 120 to the acquirer computer 130. After receiving the authorization request message, the authorization request message may then be sent to the payment processing network 140. The payment processing network 140 may then forward the authorization request message to the issuer computer 160 associated with the portable consumer device 115.

As shown in FIG. 1, the payment processing network 140 can be communicatively coupled to a support computer 150. The support computer 150 can perform functions that support or supplement the authorization process. Fraud scoring system, alert systems, reporting systems, etc are examples of support computers, according to various embodiments.

After the issuer computer 160 receives the authorization request message, the issuer computer 160 may send an authorization response message back to the payment processing network 140 to indicate whether or not the current transaction is authorized (or not authorized). The transaction processing system 140 may then forward the authorization response message back to the acquirer computer 130. The acquirer computer 130 may then send the response message back to the merchant computer 120.

After the merchant computer 120 receives the authorization response message, the access device 125 communicatively connected to the merchant computer 120 may then provide the authorization response message for the consumer 110. The authorization response message may be displayed by the POS terminal, or may be printed out on a receipt.

During the lifecycle of a transaction, the payment processing network 140 may generate account tokens of the account identifiers sent in the authorization request message. In some embodiments, an account token 128 can be generated and sent to the merchant computer 120 and/or the acquirer computer 130. The merchant computer 120 and/or acquirer computer 130 can store the account token 128 in account token database 126. In other embodiments, an account token 158 can be generated and sent to a support computer 150. The support computer 150 can store the account token 158 in account token database 156.

At the end of the day, a normal clearing and settlement process can be conducted by the payment processing network 140. A clearing process is a process of exchanging financial details between and acquirer and an issuer to facilitate posting to a consumer's account and reconciliation of the consumer's settlement position. During the clearing process, the acquirer computer 130 can send the account token 128 to the payment processing network 140. The payment processing network 140 may then use the reverse token derivation key for the particular merchant to retrieve the corresponding account identifier. The payment processing network 140 can send the account identifier to the issuer computer 160 to perform clearing and settlement. In some embodiments, clearing and settlement can occur simultaneously.

Once clearing and settlement are performed, the merchant computer 120 may remove the account identifiers stored in their systems. In other embodiments of the invention, as described herein, the merchant computer 120 can receive account tokens in lieu of account identifiers, thus eliminating the need to remove account identifiers stored in the merchant's systems. As an advantage of embodiments of the invention, the merchant computer 120 may retain the account tokens, thereby allowing customer analytics, as described above.

II. Tokenization Server

Figure 2:
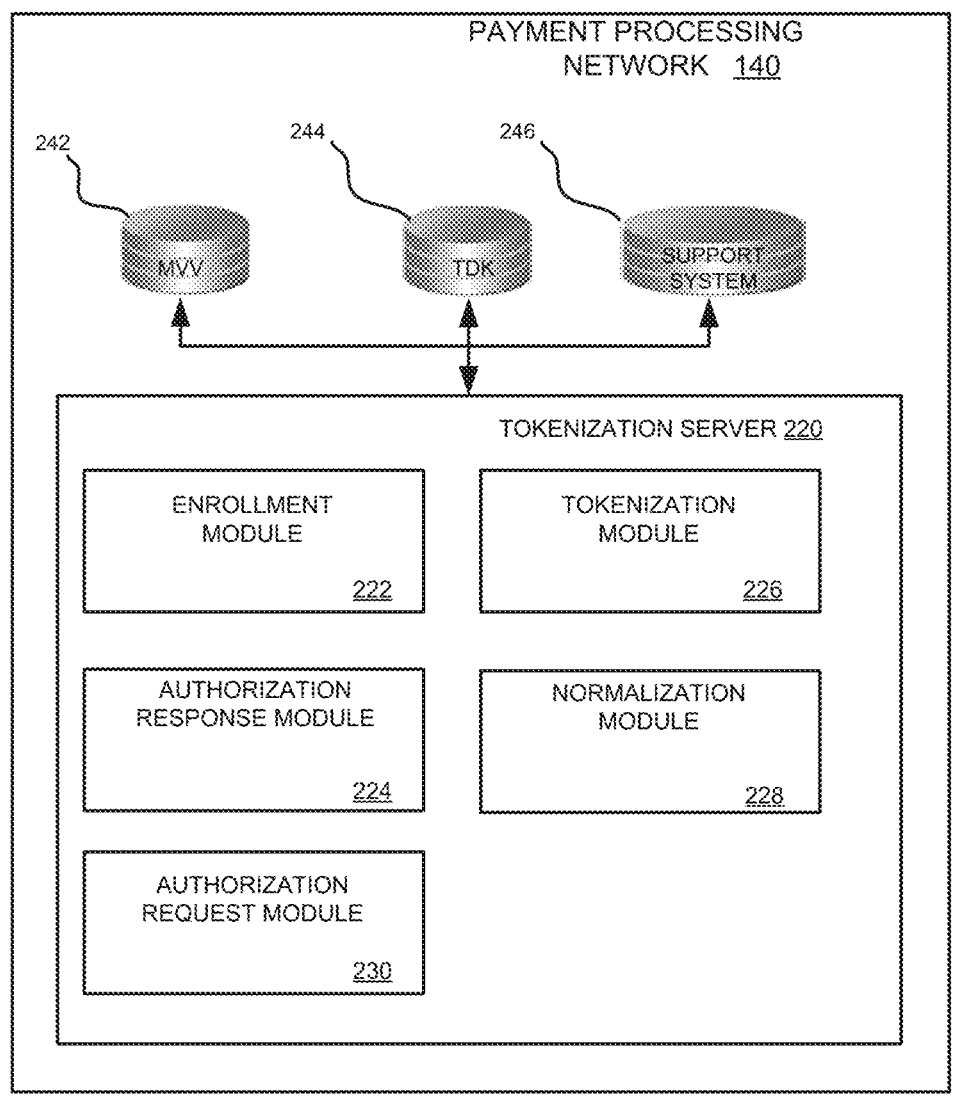
FIG. 2 is a block diagram of the components of a payment processing network, according to example embodiments.

FIG. 2 is a block diagram that shows components of the payment processing network 140, according to embodiments of the invention. As shown, the payment processing network 140 includes a tokenization server 220. The tokenization server 220 may be embodied by one or more computational apparatuses, which can perform the methods and process described herein. Typically, the tokenization server 220 is a computer or cluster of computers that behave as a single computer. For example, the tokenization server 220 can be a mainframe computer, a personal computer, a microprocessor, or some combination thereof. In another example, the tokenization server 220 may include one or more database servers and one or more Web servers. The tokenization server 220 may service the requests of one or more client computers.

The tokenization server 220 may include an enrollment module 222, an authorization response module 224, a tokenization module 226, a normalization module 228, and an authorization request module 230.

The enrollment module 222 may receive requests for enrolling external entities, such as merchants and support systems, in the tokenization service provided by the payment processing network 140. In some embodiments, the enrollment module 222 may assign an identifier to an external entity that is successfully enrolled in the tokenization service. For example, a merchant may be assigned a merchant verification value which is sent in subsequent authorization request messages sent to the payment processing network. The merchant verification values assigned to merchants can be stored in MVV database 242. Alternatively, a support system may be assigned a support system verification value that uniquely identifies the support system. The support system verification values assigned to support systems can be stored in support system database 246.

The authorization response module 224 performs a number of functions related to inserting account tokens into messages communicated between the payment processing network 140 and merchants, issuers, and acquirers. For example, according to one embodiment, the payment processing network 140 receives an authorization response messages from an issuer, processes the received authorization response message, and sends the processed authorization response message to the appropriate merchant and/or acquirer. Inserting an account token into the authorization response message by the authorization response module 224 is an example of one type of processing the payment processing network 140 performs. The authorization response module 224 can receive account tokens from the tokenization module 226.

The tokenization module 226 may generate the account tokens that are used in the embodiments described herein. In one embodiment, the tokenization module 226 generates account tokens based on an merchant verification value received in an authorization request message. For example, the tokenization module 226 may use the merchant verification value as an index into a token derivation key database (as is discussed below) to obtain a token derivation key assigned to the merchant. Once the token derivation key is obtained, the tokenization module 226 can then generate the account token by applying the account identifier to an encryption or hash function, with the merchant's token derivation key as a parameter. This and other techniques are described in greater detail below.

The normalization module 228 may provide facilities that allow the payment processing network 140 to transform an account token from a first account token form to a second account token form. Such may be an advantage for comparing the account tokens received by two or more merchants. This is because the account tokens generated by the tokenization module 226 are merchant specific. As explained below, the normalization module 228 may provide a scheme for generating an account token common to one or more merchants to provide for comprehensive analytics and services, as may be provided by merchant support systems.

The authorization request module 230 may perform a number of functions related to receiving and forwarding authorization request messages. As part of receiving an authorization request message, the authorization request module 230 may forward the authorization request message to the issuer computer 160 or to the support computer 150. Alternatively, the payment processing network 140 can forward the authorization request message to the issuer computer 160 or to the support computer 150 without using the authorization request module 230.

Further, the tokenization server 220 may have access to one or more databases of information. As shown in FIG. 2, the tokenization server 220 may have access to a MVV database 242, a TDK database 244, and a support system database 246. The MVV database 242 can store merchant verification values that are assigned to merchants that enroll in the tokenization services. As discussed above, a merchant verification value is one example of a merchant identifier and other suitable identifiers can also be used in other embodiments of the invention.

The TDK database 244 may store the token derivation keys that are assigned to merchants enrolled in the tokenization services. As described above, a token derivation key can be in any number of suitable forms using, for example, symmetrical or asymmetrical key algorithms. Further, as described above, in some embodiments, the tokenization server 220 can update the token derivation key assigned to a merchant at various points in time. For example, the tokenization server 220 may update a merchant's token derivation key if a fraudster compromises the account token data stored at a merchant. To provide such dynamic updates, the TDK database 244 can associate a token derivation key index with the assigned token derivation key.

The support system database 246 may store information regarding the support systems communicatively coupled to the payment processing network. For example, each support system may be assigned a unique support system verification value at the time that the support system is deployed or, in some embodiments, the support system may perform an enrollment process. Additionally, the support system database 246 may store information on whether the support system is capable of receiving account tokens rather than the account identifiers. In this way, the process of connecting support systems to the payment processing network can be achieved dynamically. Such dynamic connections can be implemented according to various system architectures, such as a directory service, event based systems, or any other scalable architecture.

III. Provisioning Account Tokens to External Parties

As described above, some embodiments of the present invention relate to a tokenization server that generates account tokens of account identifiers for merchants. Other embodiments of the present invention relate to a tokenization server that generates account tokens of account identifiers for support systems of a payment processing network. Further, there are still other embodiments where the tokenization server provides facilities for providing account tokens to a support system of one or more merchants. These various embodiments are described separately below. In particular, Section IV describes various embodiments for generating and sending account tokens to merchants, Section V describes various embodiments for generating and sending account tokens to support systems of the payment processing network, and Section VI describes various embodiments for generating and sending account tokens to merchant support systems.

IV. Provisioning Account Tokens to Merchants

Figure 3:
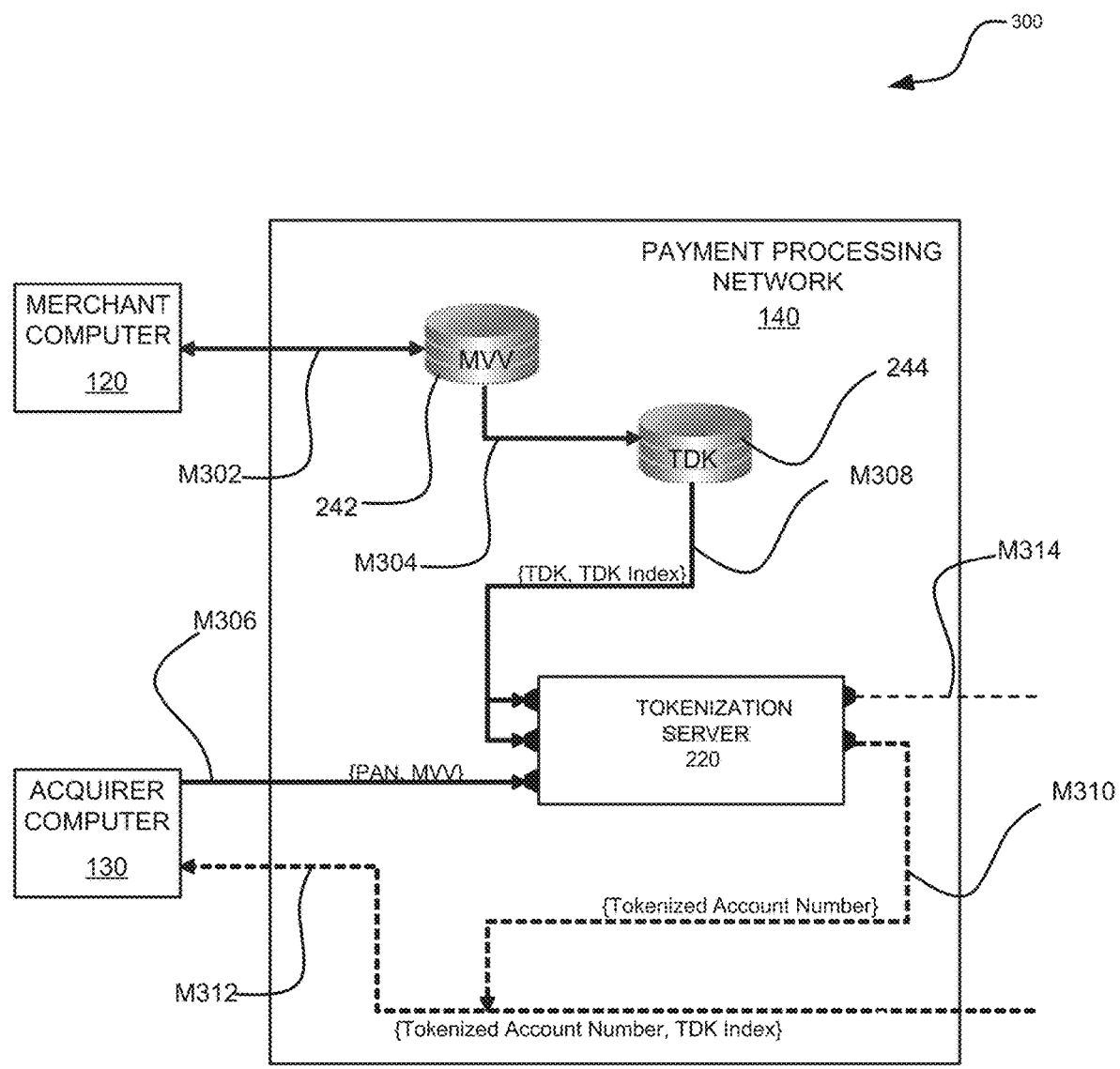
FIG. 3 is a block diagram that shows the messages involved in sending an account token, according to example embodiments.

FIG. 3 is a block diagram that illustrates a simplified system 300 that provides account tokens to merchants. In particular, the system includes a first facility for registering a merchant and a second facility for sending an account token in an authorization response message that was generated in response to an authorization request message. The operation of the system 300 is described with reference to FIG. 7, which shows a flow diagram for a method 700 of sending an account token to a merchant.

A. Merchant Registration

In some embodiments, the merchant computer 120 may transmit a registration request message M302 to the tokenization server 220. This is shown as step S701 of FIG. 7. The registration request message may include registration information, such as a merchant name, merchant category type, merchant location, contact information, account information, and any other suitable information. The registration information may be transmitted via offline communication channels (e.g., via a telephone) or online communication channels (via software interfaces communicating over the network, for example).

Responsive to receiving the registration request message M302, the payment processing network 140 may assign the merchant a merchant verification value (MVV), if a MVV is not already assigned. With respect to FIG. 7, this is shown as step S704. The MVV may be used by the payment processing network 140 to identify the merchant and information corresponding to the merchant. The MVV can be generated and maintained by the payment processing network 140 in MVV database 242 to identify the merchant. The payment processing network 140 may communicate the assigned MVV to the merchant.

In addition to assigning the MVV, the payment processing network 140 may generate a token derivation key (TDK) corresponding to the merchant and/or the MVV (message M304). With regard to FIG. 7, this is shown as step S706. As described above, and further explained below, the TDK may be a piece of information used by the tokenization module 226 to generate an account token. The payment processing network 140 may assign a unique TDK for each merchant registered in the tokenization service. In an example embodiment, the payment processing network 140 may store and maintains the TDK in database 244.

By assigning the TDK to the MVV, the payment processing network 140 provides an additional layer of security to the tokenization algorithm. To illustrate, in the event that a fraudster is able obtain the TDK assigned to merchant 120, the account token databases maintained by other merchants will be secure. Such is the case because the TDK of one merchant can not be used to reverse tokenize the account tokens generated for other merchants.

In addition to generating the TDK, some example embodiments may generate a TDK index associated with the TDK. The TDK index may allow identification of a particular TDK for those embodiments that may generate multiple or subsequent TDKs for a given MVV. The TDK index and supporting multiple TDKs per merchant are described further below.

A merchant may only need to register once, and after completion of the registration process, subsequent communications with the merchant and or the acquirer of the merchant may include the account token rather than the less secure account identifier, as will be further described below.

B. Authorization

Once a merchant is registered in the tokenization service, a payment processing network may transmit an account token in communications exchanged with the merchant and/or acquirer. One situation that the payment processing network may transmit the account token to the merchant and/or acquirer is in the authorization process, for example, when a consumer's credit card is swiped at a POS terminal located at the merchant site. When the consumer's credit card is swiped, the acquirer computer 130 may transmit an authorization request message M306 to the payment processing network 140. This is shown as step S703 of FIG. 7. The authorization request message may be in the form of a typical authorization request message, wherein the authorization request message may include the account identifier and the MVV assigned to the merchant (e.g., as may be stored in fields 2 and 62.20 of an ISO 8583 message, respectively).

Once the authorization request message is received by the payment processing network 140 (step S708 of FIG. 7), the payment processing network 140 may use the MVV stored in the authorization request message M306 to retrieve information related to the merchant. As an example, upon receipt of the authorization request message M306, the payment processing network 140 may utilize the MVV included in the authorization request message to determine if the merchant participates in the tokenization service. If so, the payment processing network 140 can retrieve the TDK associated with the MVV (step S710 of FIG. 7) and send the card account identifier and the TDK to a tokenization module 226. This is shown as message M308. The tokenization module 226 may use the TDK to generate an account token based on the token derivation key (step S711 of FIG. 7). The tokenization module 226 may ensure that the account token is unique for each account identifier, and may guarantee that the same account identifier will generate the same account token when the same TDK is used. The tokenizing function may also prevent, absent the TDK, recovery of the account identifier from the account token.

In example embodiments, the TDK assigned to merchant computer 120 is securely housed in the payment processing network 140, and is not communicated or otherwise known to external parties. However, if the TDK is somehow compromised for a specific merchant (e.g., the merchant associated with merchant computer 120), the payment processing network 140 may generate a new TDK for the specific merchant and link the generated TDK with a TDK index. In an example embodiment of the invention, the first generated TDK may be linked with a beginning index (e.g., zero or one) and each successive TDK index generated by the payment processing network may be incremented by a determinable number, such as one. Thus, the TDK index linked to the merchant's original TDK may have the value of zero, the second TDK may be linked with a TDK index with a value of one, the third TDK may be linked with a TDK index with a value of two, and so on.

In other embodiments of the invention, the TDK index is a hidden index. Examples of hidden indexes are numbers produced by a random number function or indexes that are otherwise hidden. For example, the payment processing network 140 may apply such incremental indices described above to a hash function or decryption algorithm. An advantage of using a hidden index is that it provides an additional level of separation to the tokenization scheme. This is because hidden indices hide the relationship between prior and later indices. To illustrate, in an incrementing scheme without hidden indices, a fraudster may observe that two frequently occurring account tokens may represent the same underlying account identifier if the ending of occurrences of one of the account tokens coincides with the beginning of occurrences of the other and if the TDK indices for the two account tokens are one off from each other.

The payment processing network 140 may log the TDK index for every transaction. In this way, for each transaction, the payment processing network 140 may determine the token derivation key used to generate the account token regardless of subsequent token derivation key changes. As shown in FIG. 3, a TDK index may be sent to the tokenization module 226 (see message M308).

Figure 7:
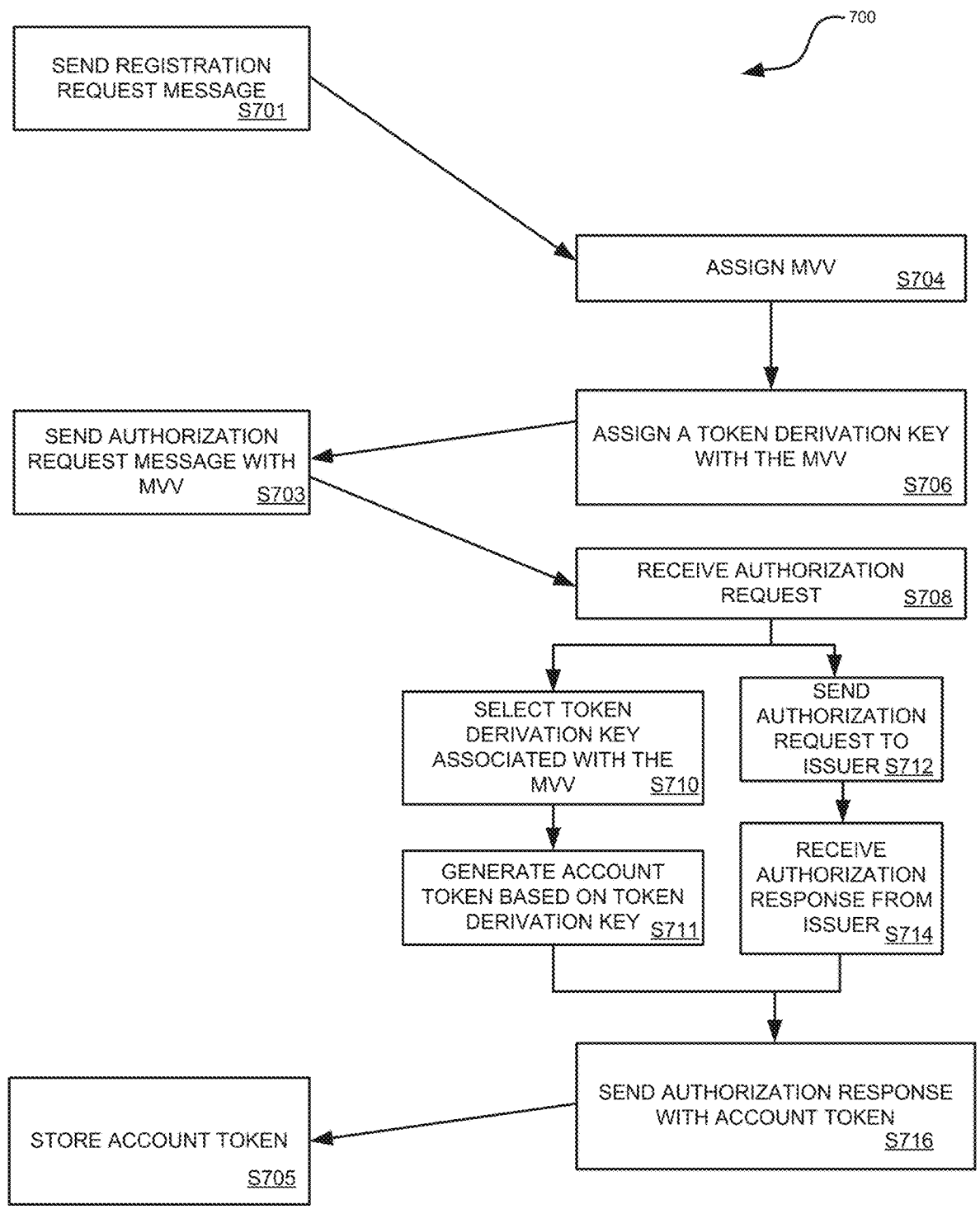
FIG. 7 is a flow diagram that shows a method for generating an account token, according to example embodiments.

Message M314 is an authorization request message that is sent to an issuer computer 160. With reference to FIG. 7, this is shown as step S712. In the typical case, an issuer computer 160 performs its functions by using an account identifier and, as a result, may not have a use for an account token. In such cases, the tokenization server 220 can send message M314 independent of when the token derivation key is selected and the account token is generated. Accordingly, the steps of generating an account token can operate in parallel with the steps of sending an authorization request message M314 to issuer computer 160 and receiving authorization response message from the issuer. This is shown in FIG. 7 as steps S710 and S711 are performed as part of a separate path than steps S712 and S714.

When an authorization response message is received from the issuer computer 160 (step S714), the tokenization server 220 may embed the account token and the optional token derivation key index in the authorization response message M310. This embedding is shown as message M310.

If authorized, the payment processing network 140 may return the account token and the TDK index (if utilized by the payment processing network 140) to the acquirer computer 130 and/or merchant computer 120 in specified fields of the authorization response message M312. This is shown in FIG. 7 as steps S716. As described above, the payment processing network 140 may also log the account token and the TDK index for the corresponding transaction.

After the acquirer computer 130 receives the authorization response message M312, the acquirer computer 130 may then send the authorization response message M312 to the merchant computer 120 to be stored in token database 126. This is shown in FIG. 7 as step S705.

The payment processing network optionally provides the ability for the merchant computer 120 to use the account tokens to request the account identifiers to be sent back to the merchant computer 120. Via a mechanism (e.g., batch, online, remote web interfaces, etc.) the merchant computer 120 can submit the MVV, TDK index, and associated account token(s). The payment processing network 140 can then recover the original card account identifiers for secure transmission back to the merchant if the payment processing network 140 logged the transaction information.

An additional advantage of the embodiments is that it allows a comparatively efficient method and system to provide merchants and/merchant acquirers account tokens. In particular, once a merchant is registered, embodiments do not require separate or additional requests for tokenization. Instead, the payment processing network automatically provides an account token as part of the authorization process. Further, because the payment processing network utilizes the MVV and account identifier stored in the authentication request message (e.g., as stored in field 2 and field 62.20, respectively), embodiments may result in little, if any, changes to how authentication request messages are presently generated.

C. Multiple Merchants

Figure 4:
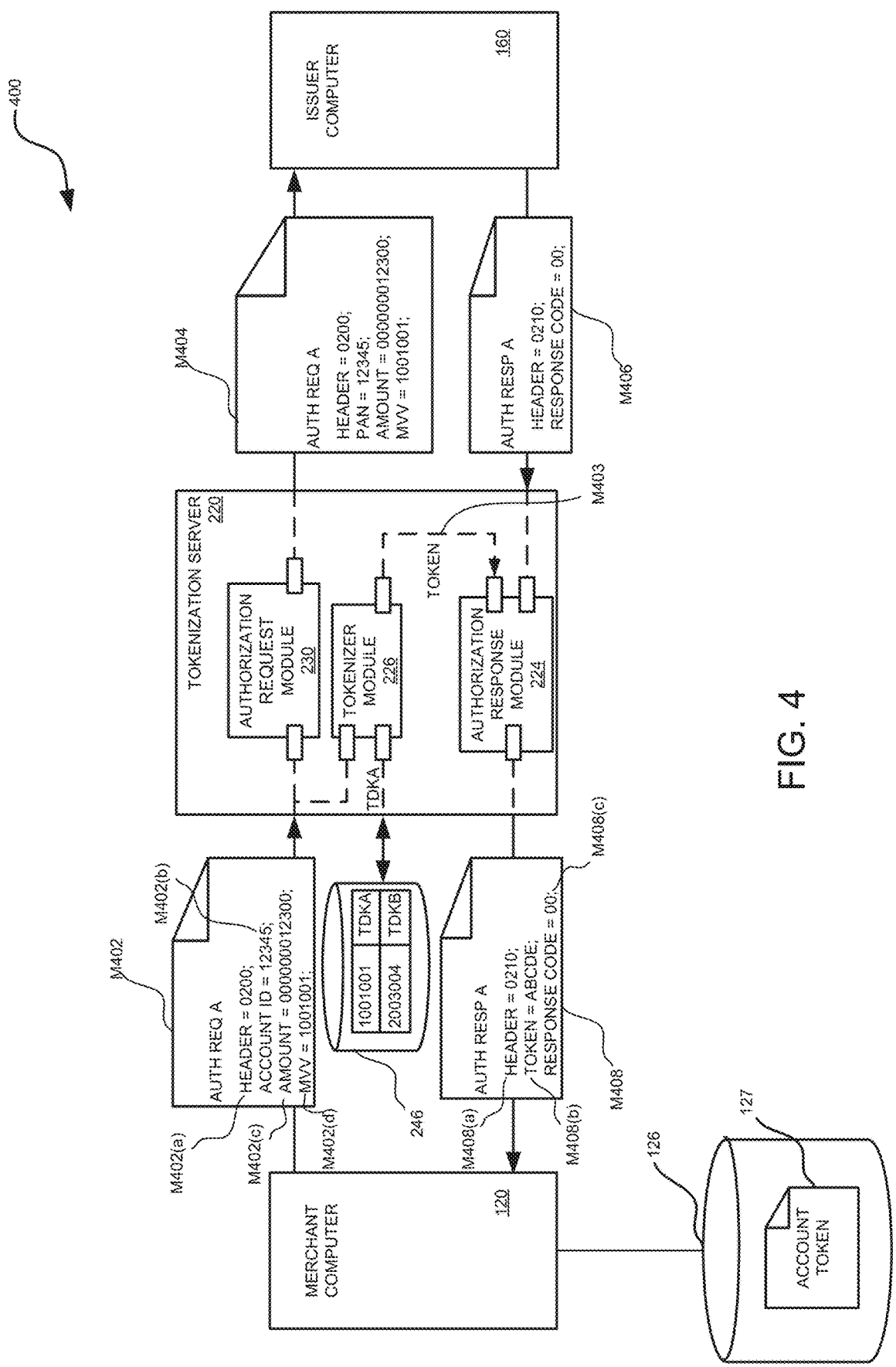
FIG. 4 is a block diagram that shows the messages involved in sending an account token to a first merchant, according to example embodiments.
Figure 5:
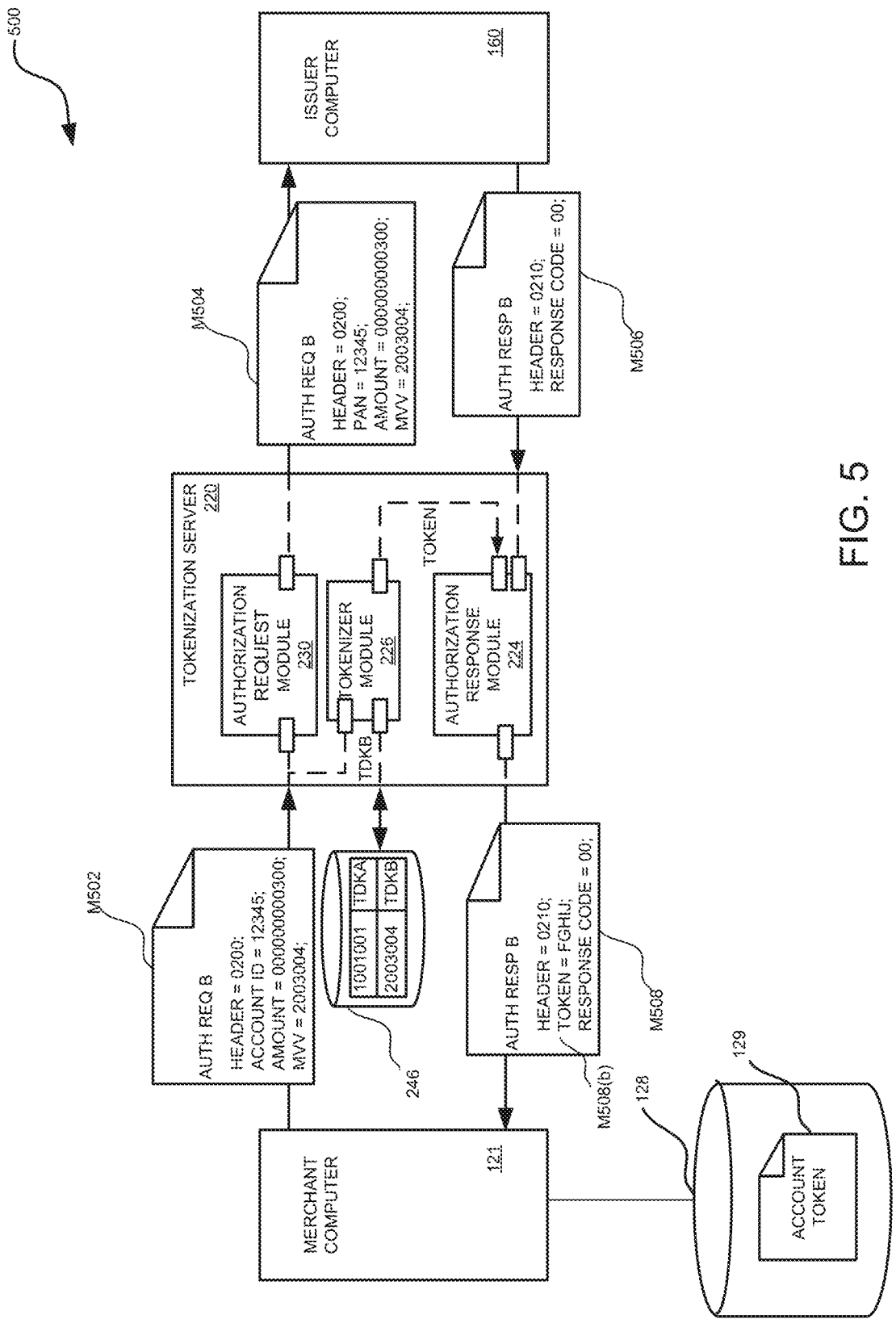
FIG. 5 is a block diagram that shows the messages involved in sending an account token to a second merchant, according to example embodiments.

As described above, the tokenization process communicates account tokens between the merchants and the payment processing network 140 as part of an authorization request and response. FIGS. 4-5 are block diagrams that show an exemplary embodiment that receives an authorization request message, generates an account token in response to receiving the authorization request message, and then inserts the generated account token in an authorization response message that is sent back to the merchant. In particular, FIGS. 4-5 highlight, among other things, how embodiments of the present invention can generate, for a single account identifier, account tokens that vary across different merchants but are consistent for the same merchant.

In particular, FIG. 4 shows merchant computer 120 sending an authorization request message M402 to the payment processing network 140. Authorization request message M402 can be an authorization request message sent in response to consumer 110 swiping a credit card at the merchant's access device 125. Alternatively, message M402 can be an authorization request message received by the tokenization server 220 when consumer 110 makes an Internet purchase from the merchant's web site. In any case, the authorization request message M402 can include transaction data, such as information derived from the card (e.g., the account identifier M402(4), the terminal (e.g., the merchant verification value M402(4), the transaction (e.g., the amount M402(0), together with other data which may be generated dynamically or added by intervening systems (e.g., the header M402(*a*)). Although FIG. 4 shows the merchant computer 120 sending authorization request message M402 to the tokenization server 220, such messages can be sent through an acquirer computer 130, as is described above.

In some embodiments, authorization request message M402 can be in the form of an ISO (International Organization for Standardization) 8583 message. In other embodiments, authorization request message M402 can take the form of a web based call to a web service offered by the tokenization server 220. For example, the authorization request message M402 can be in the form of an XML message.

Once the tokenization server 220 receives the authorization request message M402, the authorization request module 230 can validate the authorization request message M402 and then can route the authorization request message M402 to the issuer computer 160 in the form of authorization request message M404. FIG. 4 shows that much of the information found in authorization request message M402 is also included in authorization request message M404. Although not shown, authorization request message M404 can include additional information, according to some embodiments. For example, some embodiments can include routing information that describe the payments systems that have received the authorization request message.

In addition to verifying the authorization request message M402 and routing authorization request message M404 to issuer computer 160, the tokenization server 220 can also generate an account token for the account identifier associated with the authorization request message M402. The steps for generating the account token for the account identifier associated with the authorization request message M402 can begin before the tokenization server 220 receives an authorization response message M406. FIG. 4 shows that authorization request message M402, or some portion thereof, is received by the tokenization module 226. Once the tokenization module 226 receives authorization request message M402, the tokenization module 226 can search for the token derivation key associated with the merchant using the MVV of the authorization request message. For example, FIG. 4 shows that the value of the MVV of authorization request message M402 is '1001001'. The tokenization module 226 then can search the TDK database 246 for a token derivation key associated with '1001001'. According to FIG. 4, the TDK associated with '1001001' is 'TDKA'. Accordingly, the tokenization module 226 can access the TDK database 246 to retrieve the appropriate token derivation key associated with merchant computer 120.

After the tokenization module 226 retrieves the token derivation key associated with the MVV, the tokenization module 226 can generate the account token for the account identifier of the authorization request message M402. As described above, the tokenization module 226 can use a variety of methods for generating account tokens. In one embodiment, the tokenization module 226 applies a symmetric encryption algorithm to the account identifier. The token derivation key associated with the MVV can be used as the key for the symmetric encryption algorithm.

The generated account token is then sent to and received by the authorization response module. This is shown as message M403.

Upon receiving the authorization request message M404, the issuer computer 160 can analyze the authorization request message M404 and make a determination on whether the transaction should be authorized or not. If the issuer 160 verifies that the transaction can proceed, the issuer 160 can send an authorization response message to the payment processing network 140. This is shown as authorization response message M406.

FIG. 4 shows that the account token M403 and the authorization response message M406 are received by the authorization response module 224. In some embodiments, because the tokenization module 226 and the authorization request module 230 operate independently, the authorization response module 224 can receive the account token M403 and the authorization response message M406 in any order. When both the account token M403 and the authorization response message M406 are received, the authorization response module 224 can then send the authorization response message M408 to the merchant 120.

Authorization response message M408 can be in any form. In some embodiments, authorization response message M408 generally takes the form of an ISO 8583 message with account token embedded in the fields. The authorization response message M408 may include a header M408(*a*) that indicates that the message is an authorization response message and a response code M408(*c*) to indicate whether the authorization request is authorized or denied. As described above, these are fields generally provided by the authorization response message M406 sent by the issuer computer 160. It should be noted that the indication that the message is an authorization request message or an authorization response message need not be included in headers 402(*a*) and 408(*a*), respectively. For example, as described below with respect to FIGS. 6A-E, the messages may include a message type field 604 that specifies the message class and category of function. Returning to FIG. 4, the authorization response module 224 can embed the account token in field M408(*b*) of the authorization response message M408 that is sent to the merchant computer 120. In some embodiments, as described below, the authorization response module 224 can also embed a token derivation key index in the authorization response message M408 that is sent to the merchant 120 computer.

As is described in greater detail below, with reference to FIGS. 6A-E, the format of an authorization response message storing an account token can vary according embodiments of the present invention.

After the authorization response module 224 sends the authorization response message M408, the authorization response message M408 can be received by the merchant computer 120. Although not shown in FIG. 4, the merchant computer 120 can receive the authorization response message M408 via the acquirer computer 130. The merchant computer 120 can then store the account token 128, as well as other transaction data, in analytics database 126. The analytics database 126 does not include any indication of the account identifier used in the transaction, according to example embodiments.

If at some later point in time, the consumer 110 makes another purchase at merchant 120 with the portable consumer device 115, the tokenization server 220 may generate an account token with the same value as the sent in authorization response message M408. That is, the merchant 120 may receive another account token with the value ABCDE.

However, if at some later point in time, the consumer 110 makes another purchase with the portable consumer device 115 at a different merchant, the tokenization server 220 may generate an account token with a different value. For example, FIG. 5 shows another payment transaction processed by the tokenization server 220. As shown in FIG. 5, authorization response messages M502, M504 involve transactions using the same account identifier used in FIG. 4. In particular, account 12345' is used to make a purchase at a merchant. However, the payment transaction involves a different merchant than the one used in FIG. 4. This is shown in the merchant verification value of the authorization requests M502, M504, where the merchant verification value involved in the transaction is '2003004'.

In comparison to the payment transaction processed in FIG. 4, the tokenization module 226 may receive the merchant verification value of '2003004' contained in the authorization request message M402. Using the merchant verification value, the tokenization module 226 can retrieve token derivation key B from the TDK database 126. The tokenization module 226 may then use the token derivation key B to generate the account token for the account identifier stored in the authorization request message M502. The tokenization module 226 can then send the generated account token to the authorization response module 224 to generate an authorization response message M508 that is sent to merchant 121. It is to be noted that the token 508(b) may differ from the token generated for merchant computer 120. In turn the merchant 121 can store the account token 129 in analytics database 127. Later, the merchant 121 can use the account token 129 to perform analytics or supplementary processing.

D. Authorization Response Message Formats

Figure 6:
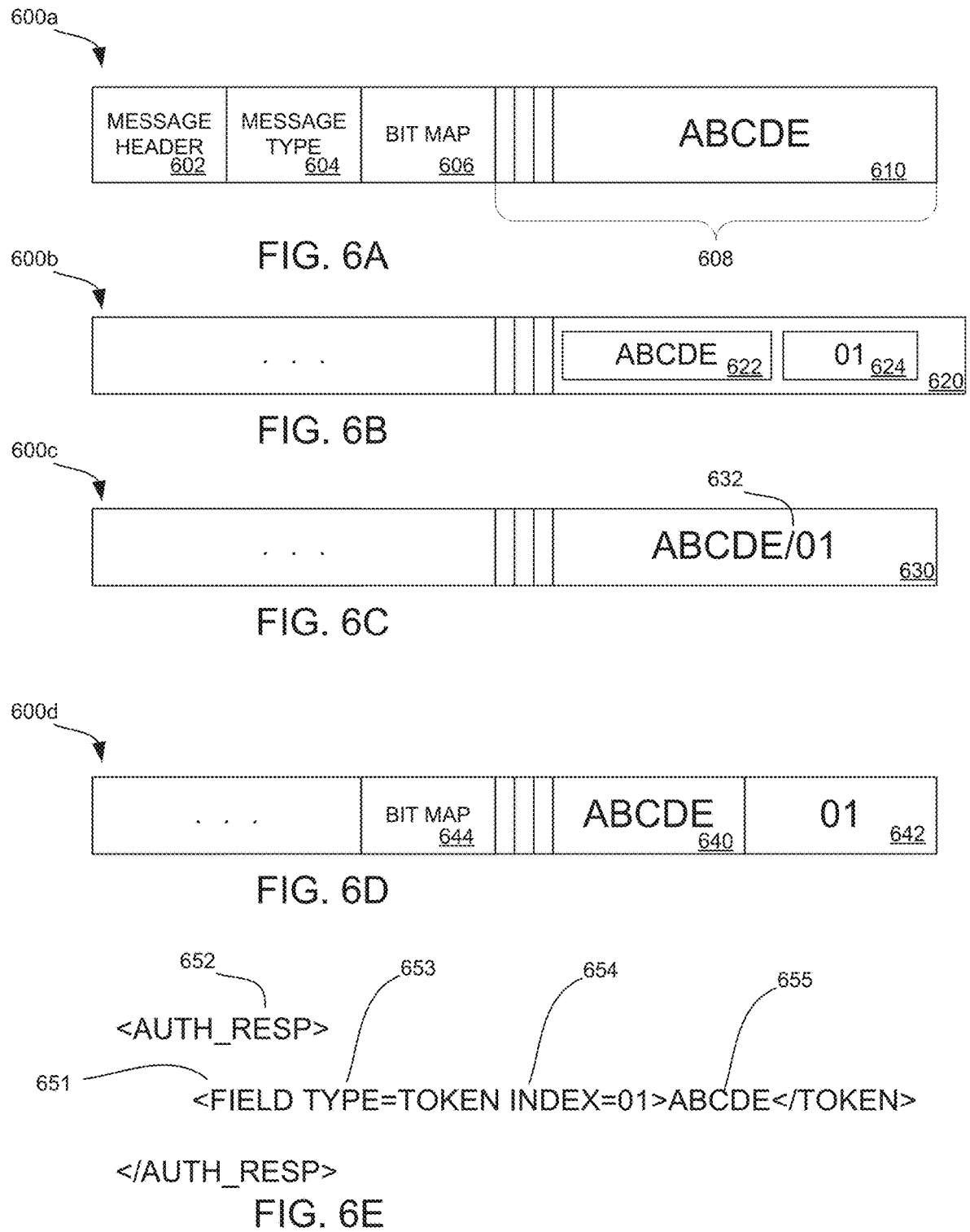
FIGS. 6A, 6B, 6C, 6D, and 6E are diagrams that show various formats of an authorization request message, according to example embodiments.

As described above, an authorization response message can include an account token that is generated based on an account identifier and a merchant verification value. As is further described above, the account token can be embedded in the authorization response message in any number of ways. For example, FIGS. 6A-E are diagrams that show different ways an account token can be embedded in the authorization response message. In particular, FIG. 6A is a diagram showing an authorization response message 600a that stores an account token in a field of the authorization response message. As shown in FIG. 6A, the authorization response message 600a can include a message header filed 602, a message type field 604, a bit map field 606, and a number of data fields 608.

The message header field 602 can contain basic message identifiers and routing information along with message processing control codes and flags.

The message type field 604 can specify the message class and the category of function. For example, a message type field 604 value of '0110' can indicate an authorization response message.

The bit map field 606 can specify which data fields are in an authorization response message. For example, a first bit in the bit map field 606 may indicate if a first type of data field is present in the data fields 608, a second bit in the bit map field 606 may indicate if a second type of data field is present in the data fields 608, and a nth bit in the bit map field 606 may indicate if a nth type of data field is present in the data fields 608. A bit map field can be of any size. In example embodiments, a bit map field is a 64-bit field.

The data fields 608 can include any number fields used to process a message. For example, some fields may indicate a response code (e.g., whether a payment request is authorized or rejected). In particular, the data fields 608 can include an account token field 610. The account token field 610 can store the account token corresponding to an account identifier sent via a corresponding authorization request message. It is to be noted that when an account token field is present in the authorization response message, an appropriate bit in the bit map field 606 can be set.

Alternatively, an authorization response message can include a token derivation key index associated with the token derivation key used to generate the account token. As described above, providing a token derivation key index to the merchant computer allows the merchant computer to request the tokenization server 220 to return back the account identifier associated with the account token. FIGS. 6B, 6C, and 6D are diagrams showing authorization response messages 600b, 600c, 600d that store a token derivation key index. For example, as shown in FIG. 6B, an account token and a token derivation key index can be stored in single data field 620 as sub-fields 622, 624 of authorization response message 600b. According to some embodiments, sub-fields 622, 624 can be of predetermined length. Alternatively, as shown in FIG. 6C, the account token and token derivation key index can be stored in a single data field 630 of authorization response message 600c but may include a separation symbol 632 to indicate where within data field 630 the account token ends and the index begins (or vice versa). Although the separation symbol 632 is shown to be a '/', it is to be appreciated that any other suitable symbol can be used. Using a separation symbol allows for variable length account tokens and token derivation indexes. Still further, in other embodiments, as shown in FIG. 6D, the account token and token derivation key index can be stored in separate data fields 640, 642 of the authorization response message 600d. Accordingly, the bit map field 644 of the authorization response message 600d may include a first indication that the account token field 640 is present and a second indication that the token derivation key index data field 642 is present.

FIGS. 6A-D describe authorization response message formats that rely on structured placement of the account token and/or index. However, other embodiments can use techniques that provide greater flexibility for the location and content of the data fields stored in the authorization response message. For example, FIG. 6E shows a simplified diagram illustrating a markup representation of the authorization response message. Instead of relying on a bit map, such as may be present in FIGS. 6A-D, the authorization response message can be sent in a form that uses tags to identify data and attributes to describe characteristics of the data. For example, the authorization response message can include a message tag 652 to identify that the message is an authorization response message. Further, the message tag 652 can include a number of sub-tags to represent the various fields of the authorization response message. As shown, field tag 651 includes a type attribute 653 and a index attribute 654. The type attribute 653 indentifies that the type of field is a token field. The optional index attribute 654 identifies the index associated with the account token. The tag content 655 indicates the value of the account token, 'ABCDE'. Although not shown in FIG. 6E, the field tag 651 can optionally include an end tag.

FIG. 6E is just an example of one format for a markup representation of the authorization response message. Other embodiments can use alternative markup representations.

V. Account Identifier Substitution for Support Systems

Section IV describes techniques for communicating account tokens to a merchant computer. Such account tokens can be sent to the merchant computer during the authorization of a payment request, for example, in an authorization response message sent from the tokenization server to the merchant computer via an acquirer computer. In addition to communicating account tokens to a merchant, a tokenization server may also communicate with a number of support systems. Such support systems, as described above, may perform primary and auxiliary functions involved with authorizing, settling, and clearing transactions. The support systems may reside within a payment processing network or as an external partner that is in operative communication with the payment processing network. This section now describes methods, systems, and apparatuses for communicating an account token to these support systems.

A. System for Providing Account Tokens to a Support System

Figure 9:
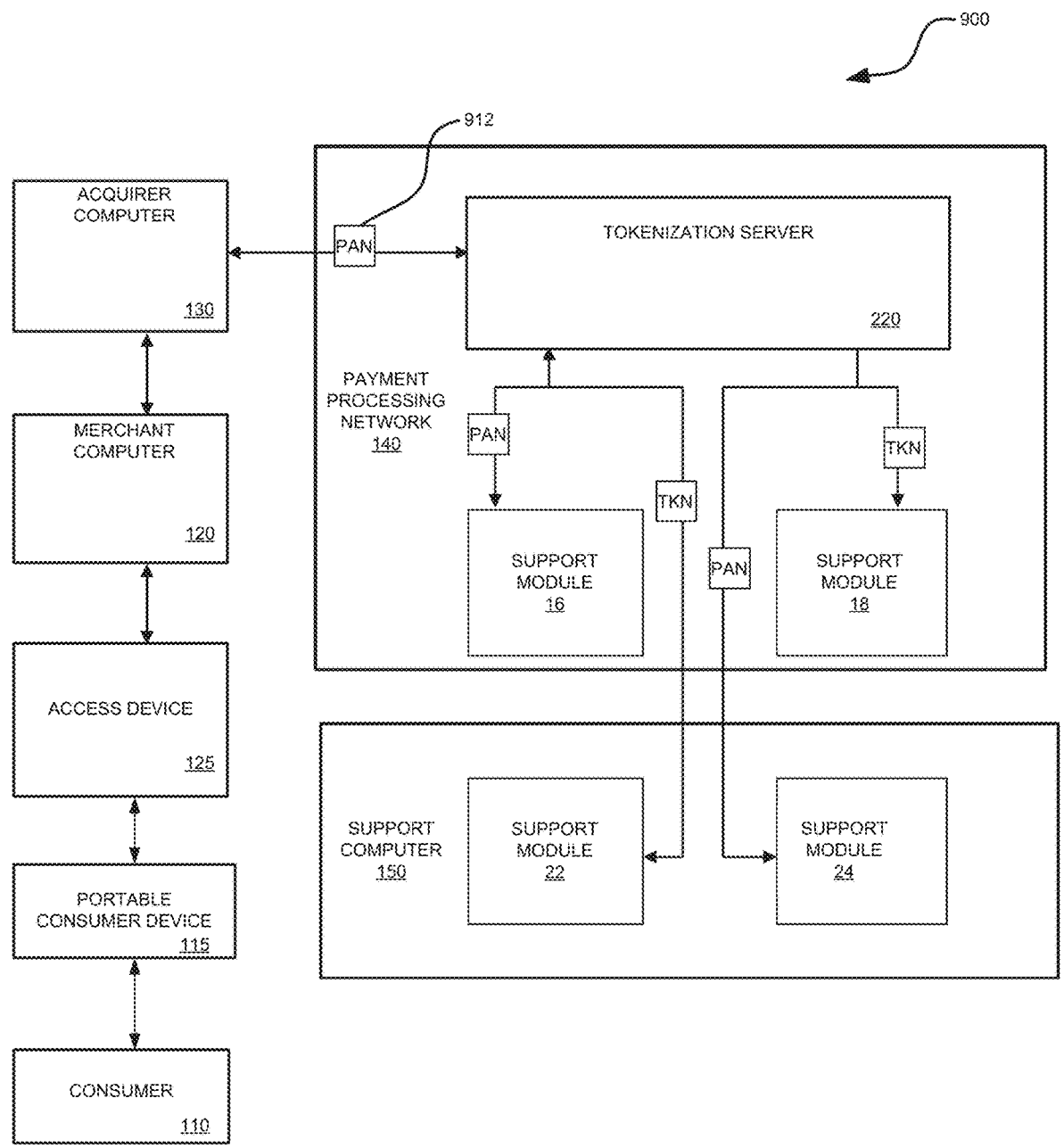
FIG. 9 is a block diagram showing account tokens sent to a support computer, according to example embodiments.

FIG. 9 is a block diagram that shows messages exchanged within a system 900 that communicates account tokens to a number of support systems. In certain embodiments, a payment processing network 140 may be in operative communication with one or more acquirer computers 130 via the Internet or some other communication medium.

In embodiments of the invention, the payment processing network 140 may be in further operative communication with a support computer 150. The support computer 150 may perform supporting functions for the payment processing network 140 via support modules 22 and 24. An example of a supporting function is scoring a transaction for fraud.

As an illustration of the interaction between the payment processing network 140 and the support computer 150, a payment transaction is initiated by the acquirer computer 130 when a consumer 110 conducts a transaction with a merchant associated with merchant computer 120 via the access device 125. As described above, the acquirer computer 130, for example, may be operated by a banking institution that oversees an account associated with the merchant. The acquirer computer 130 may transmit an authorization request message to the payment processing network 140 and the authorization request message may be received by the tokenization server 220. In turn, the tokenization server 220 may transmit at least some portion of the authorization request message to other systems. For example, the tokenization server 220 may transmit the account identifier to supporting module 16. Further, the account identifier may be communicated to the support module 24 of the support computer 150.

Although the payment processing network 140 may need the account identifier for any number of reasons, such as moving money, checking status, and reporting, some of the support computers may not. For example, a support computer may only use the account identifier as an identifier or unique index. Exacerbating security risks associated with the use of account identifiers, these support computers may store the account identifier in various databases, problem logs, dump logs, core dumps, and other similar memory storages and data structures. Thus not only is the account identifier potentially exposed to fraudsters when the account identifier is transmitted between different systems but there is also a risk that a fraudster may obtain the account identifiers by hacking into these support computer, even long after the transaction has been conducted. Accordingly, the payment processing network 140 may improve security of an account identifier by communicating account tokens rather than account identifier, where possible.

As shown in FIG. 9, the acquirer computer 130 may communicate the account identifier to the payment processing network 140. In particular, the tokenization server 220 may receive a primary account number 912. If the tokenization server 220 determines that the primary account number is new to the tokenization server 220, the tokenization server 220 may generate an account token of the account identifier. Otherwise, the tokenization server 220 can use the account token previously generated for the account identifier. The account token can be used to identify an account, account identifier, and/or a transaction. The account token may include card characteristics or, in some example embodiments, the card characteristics may be data distinguishable from the account token. The tokenization server 220 may then store the generated account token and, if present, the associated card characteristics. In some embodiments, the characteristics are updated as a change is noticed or periodically refreshed.

Once the tokenization server 220 generates or identifies the account token associated with the primary account number 912, the tokenization server 220 may communicate the account token to the support modules that do not require the account identifier (e.g., primary account number 912).

As part of the process of determining whether a support system requires an account identifier, the tokenization server 220 may query support system database 246 (see FIG. 2) to determine whether the account identifier is required for a specified support system. In such an embodiment, the tokenization server 220 may lookup the support system according to a support system verification value assigned to the support module when the support module is enrolled with the tokenization server 220. For example, support system database 246 may indicate that the support module 16 requires an account identifier while the support module 18 does not require an account identifier or can accept an account token in lieu of a account identifier. Accordingly, after making the determination, the tokenization server 220 will transmit the account identifier to support module 16 and an account token to support module 18. A similar process can be used for the support modules 22, 24 residing on the support computer 150.

Alternatively, whether or not a support module requires an account identifier or can instead accept an account token may be determined by manual configuration (e.g., input received by an administrator of the payment processing network 140) or via an application programming interface (API) of the support computer 150 that may allow the tokenization server 220 to interrogate the various support modules 22, 24 as to their requirements as it relates to receiving an account identifier or an account token.

Embodiments of the invention provide numerous advantages in the development of secure data centers. In particular, embodiments of the invention enable the development of comparatively more secure transactions that transmit an account identifier. Embodiments of the invention can provide such results because they utilize an account token rather than sensitive data, such as the account identifier. Specifically, embodiments of the invention generate account token data that is associated with a account identifier and then communicate the account token data rather than the account identifier to the various support systems. Use of the account token data reduces the risks of communicating the account identifier to various support systems as well as storing sensitive data within such systems.

B. Method for Providing Account Tokens to a Support System

Figure 10:
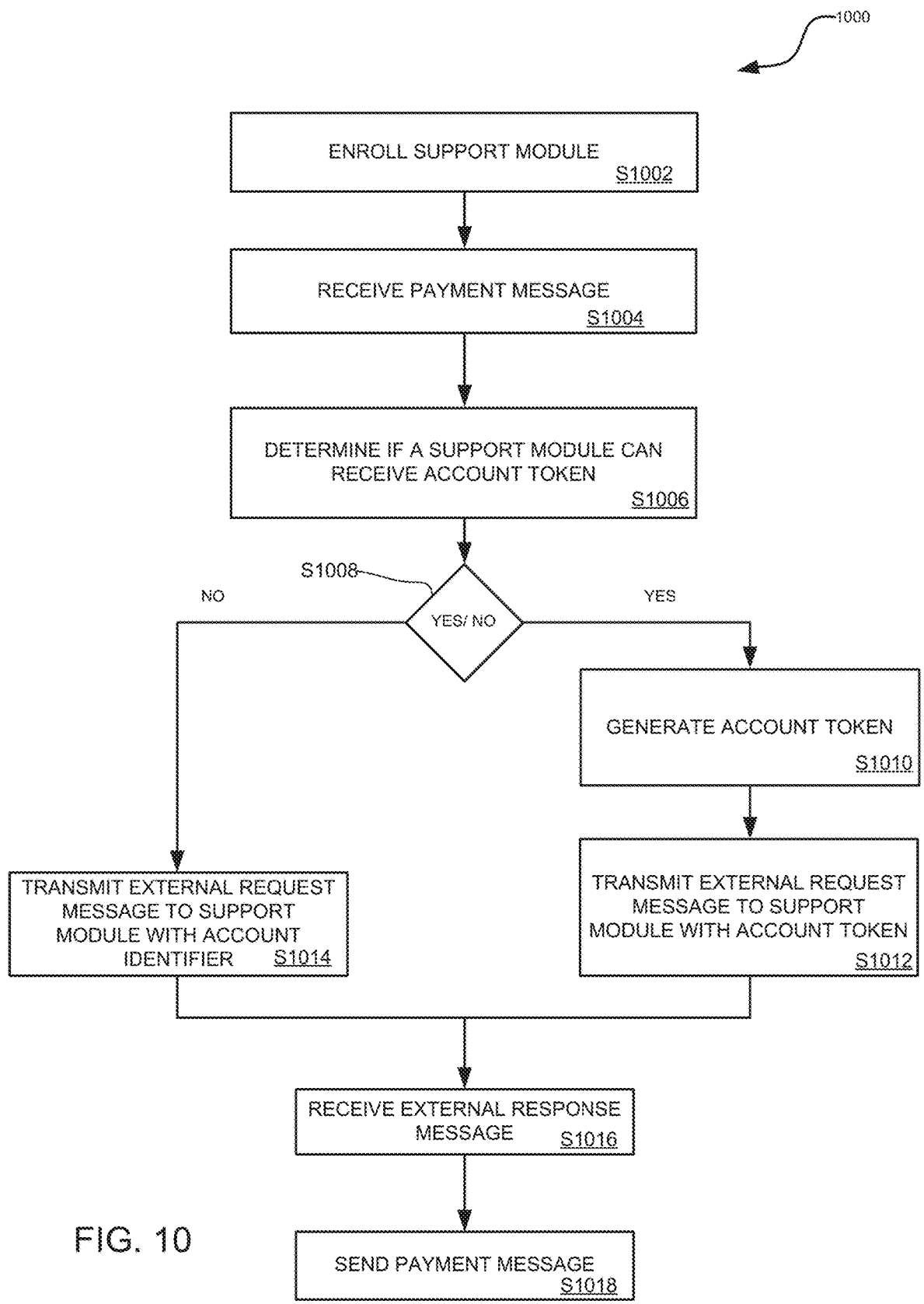
FIG. 10 is a flow diagram showing steps for sending an account token to a support computer, according to an example embodiment.

FIG. 10 is a flow diagram showing a method 1000 of providing an account token to a support system. The steps performed by the method 1000 can be performed by the tokenization server 220 or by any other suitable module of the payment processing network 140. In alternative embodiments, one or more steps described herein can be performed by any other suitable computer system, such as the issuer computer 160, for example.

The method 1000 may begin by enrolling a support module with the tokenization server 220. This is shown as step S1002. A support module may be running within the payment processing network 140 (e.g., support modules 16, 18) or within a support computer 150 that operates external and independent of the payment processing network 140 (e.g., support modules 22, 24). Enrolling a support module can involve, in some embodiments, communicatively connecting the support module to the tokenization server. For example, the support computer may offer the support module as a web service. In such cases, the tokenization server 220 (or the payment processing network 140 in general) and the support computer 150 may communicate using an APIs defined by each entity. Alternatively, the support modules may be deployed by the system administrator of the payment processing network 140. In such cases, the support module may be deployed wholly within the payment processing network 140, external to the payment processing network 140, or some combination thereof. The enrollment process, whether offered as a web service or as a deployed system, may indicate whether the support module is to receive an account identifier or an account token in later communications. Such information may be stored in the support system database 246 (see FIG. 2) or may be accessible via an interface provided by the support module.

Once enrolled, the tokenization server 220 may receive a payment message. This is shown as step S1004. As used herein, a "payment message" can refer to either an authorization request message or an authorization response message, which are described above.

After receiving the payment message, the tokenization server 220 may determine if a support module can receive an account token. This is shown as step S1006. The tokenization server 220 can determine if the support module can receive an account token using the information received when the support module was enrolled with the tokenization server 220. For example, the tokenization server 220 may access support system database 246 to determine whether a specific support module can receive an account token.

Step S1008 is a decision point on whether the support module can receive an account token, as is determined in step S1006. If yes, step S1010 is then performed. Otherwise, step S1014 is performed.

Step S1010 involves generating an account token from the account identifier included in the payment message (see step S1004). The tokenization server 220 may generate an account token for the account identifier using any of the methods or techniques described above. For example, the tokenization server 220 may encrypt the account identifier using any suitable encryption method. In some embodiments, a single token derivation key is used for tokenizing account identifiers for all support modules. In other embodiments, each support module, or a group of support modules, is assigned a specific token derivation key that is used to generate the account token. As described above, assigning different token derivation keys to different support modules can add an additional level of security among the different support modules.

After the account token is generated, the tokenization server 220 can then transmit an external request message to the support module, wherein the external request message includes the account token. This is shown as step S1012. As used herein, an "external request message" can refer to a message that is sent to the support module that causes the support module to provide its supporting function. In some embodiments, the external request message is sent according to an API provided by the support module. For example, the support module can provide a SOAP (Simple Object Access Protocol) procedure that can be used to receive and transmit information from and to the tokenization server 220. The SOAP procedure may then provide an implementation of a web service provided by the support module. XML can be used to define the message formats for the messages sent between the support module and the tokenization server 220. Again, examples of such procedures may relate to scoring a transaction for fraud, generating alerts to a customer or merchant, reporting, etc.

As described above, if the support module can not receive an account token based on decision step S1008, step S1014 is then performed. According to step S1014, the tokenization server 220 transmits an external request message to the support module with the account identifier. Such an external request message can be sent according the techniques described above, as it relates to step S1012.

After the external request message is sent to the support module, the tokenization server 220 can receive an external response message from the support module. This is shown as step S1016. As used herein, an "external response message" can refer to a message that is sent back to the tokenization server 220 from the support module in response to processing the external request message. In some embodiments, the external response message is a response message sent according to a SOAP procedure call. XML can be used to define the message format of the external response message. The external response message can include an indication of the web service initiated by the external request message. For example, the external response message can include a field that indicates whether the support function completed successfully or can include specific information, such as the fraud score of a transaction.

After receiving the external response message, the tokenization server 220 can send a payment message. This is shown as step S1018. As described above, a payment message can be an authorization request message. For example, the tokenization server 220 may have sent the external request message to a fraud scoring system in step S1012. In response to receiving the fraud score in the external response message in step S1016, the tokenization server 220 can forward an authorization request message with the fraud score to the issuer computer 160. The issuer computer 160 can then process the authorization request message and use the fraud score to determine whether the transaction is authorized.

Alternatively, also described above, a payment message can be an authorization response message. For example, the tokenization server 220 may have sent the external request message to a reporting system that can generate reports of transaction histories based on a number of categories.

Because the reporting system is not used by the issuer computer 160 as it relates to determining whether a transaction is authorized, the tokenization server 220 can send the external request message after the tokenization server 220 receives the authorization response (e.g., in step S1004). Accordingly, the payment message involved in step S1018 is an authorization response message that may be sent back to the acquirer computer.

Whether the payment message is an authorization request message or an authorization response message, the payment message may include external system data. As used herein, "external system data" can refer to any information obtained from the support module that is to be communicated to an external entity, such as a merchant computer or an issuer computer. For example, external system data can refer to an offer or reward that a consumer obtains after a predetermined number of purchases at a store. As another example, external system data can refer to a risk score that is sent to an issuer so that the issuer can determine whether to authorize the payment request.

Step S1018 can also include determining the account identifier from the account token stored in the external system data. This step may allow the tokenization server 220 to route the payment message to the appropriate merchant computer, for example.

It is to be noted that the timing of when the various steps of the method 1000 are performed may vary according to example embodiments. For example, in some embodiments the authorization process operates independent of the function performed by the support module. In such cases, steps S1016 and S1018 can be performed in any order. Such may be the case where the support module merely logs transactions, for example.

VI. Provisioning Account Tokens for Merchant Support Systems

FIGS. 3, 4, 5, 6A-E, and 7 describe various embodiments that, in response to an authorization request message, send a merchant specific account token to a merchant in an authorization response message. In comparison, FIGS. 9 and 10 describe embodiments that, in response to an authorization request message, send account tokens to a support system of the payment processing network.

Although not yet discussed, a merchant may wish to communicate its merchant specific account tokens to a support system. To illustrate, a merchant computer can use a third-party to provide risk analysis services. Accordingly, when a merchant receives an authorization response message with an account token from a payment processing network, the merchant can then send the authorization response message, or portions thereof, to the third-party service provider for further processing. Communicating the account token to the third-party service provider is comparatively secure because the account token can not be used to conduct a transaction. When the third-party service provider receives the account token, it can, for example, compare the account token against a database that stores high risk account tokens and report a risk score back to the merchant.

In order to provide improved risk analysis, it may be desirable for the third-party service provider to compare account tokens it receives from one merchant against account tokens it receives from another merchant. However, as described above, the account tokens that the payment processing network sends to the merchants are specific to that merchant. That is, for a given account identifier, the account token generated for one merchant is going to be different than the account token generated for another merchant. As a result, the third-party service provider will be unable to determine if a first account token from a first merchant and a second account token from a second merchant are associated with the same underlying account identifier. This example illustrates the difficulty of analyzing account tokens across different merchants.

Figure 11:
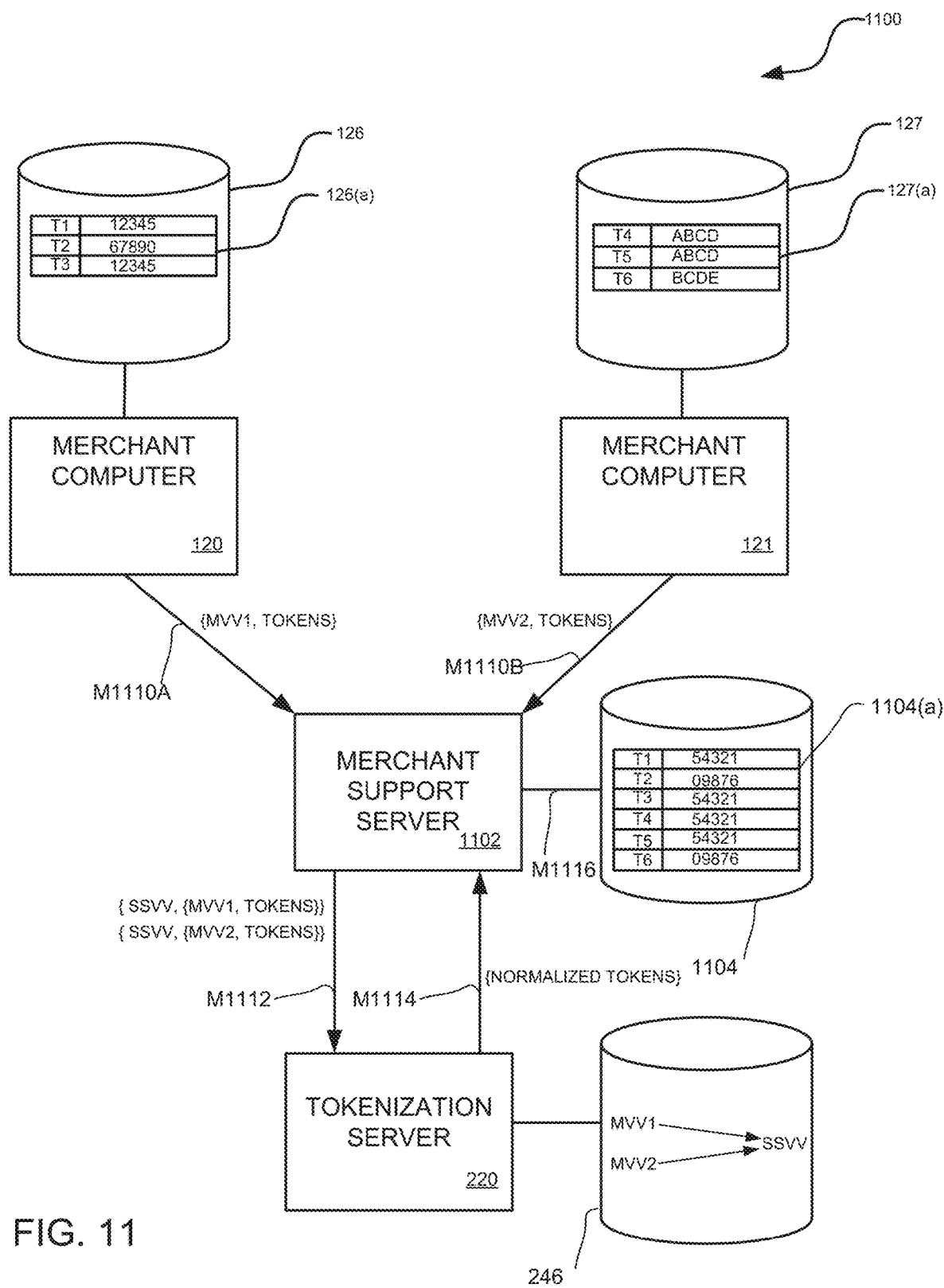
FIG. 11 is a block diagram showing a first technique for normalizing account tokens, according to example embodiments.
Figure 12:
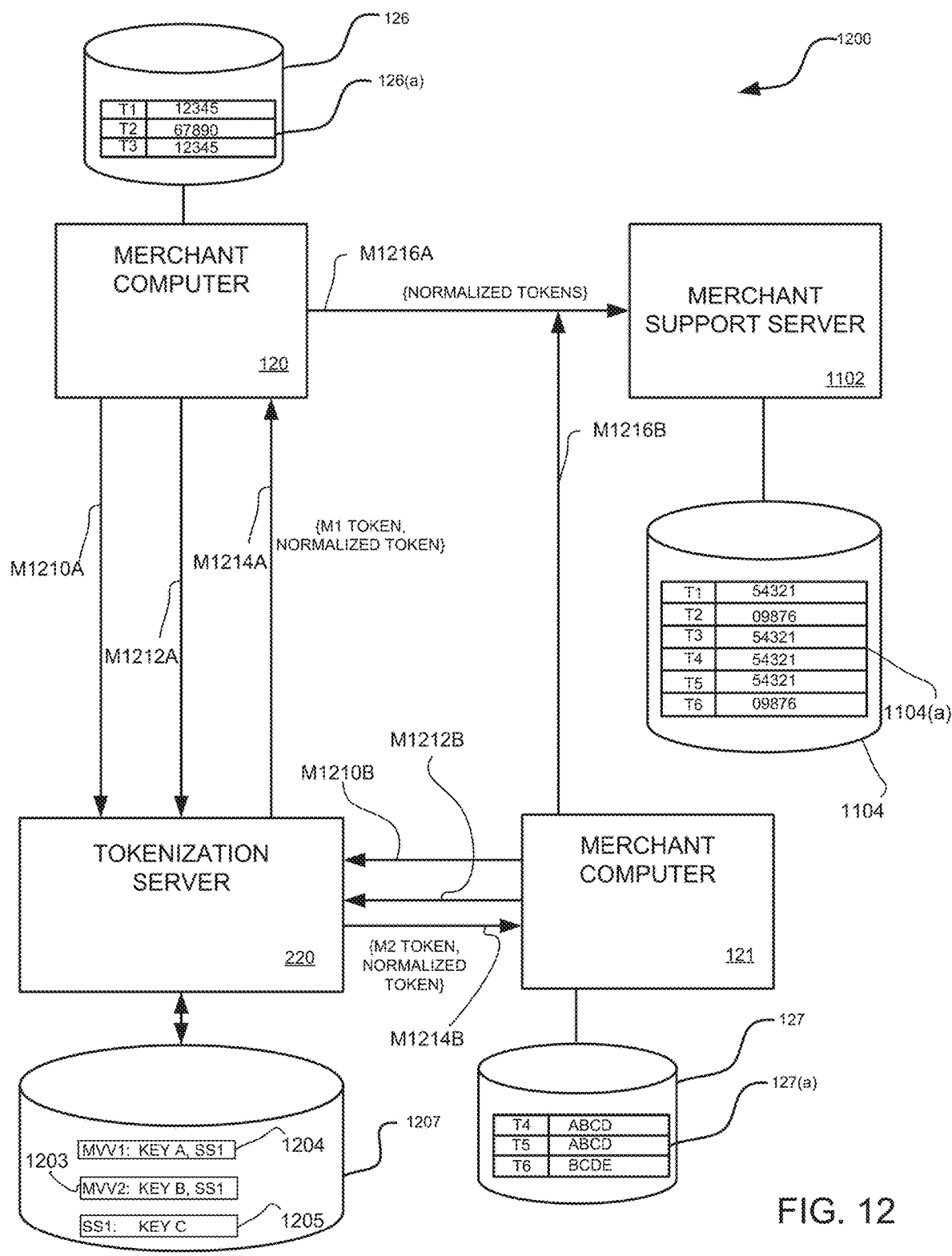
FIG. 12 is a block diagram showing a second technique for normalizing account tokens, according to example embodiments.

FIGS. 11 and 12 illustrate various approaches that address these and other limitations for third-party support for processing account tokens across multiple merchants.

To begin, FIG. 11 is a block diagram that shows a system 1100 that includes merchants 120, 121, a merchant support server 1102, and the tokenization server 220. As shown, merchants 120, 121 may each store account token data in their respective account token databases, 126, 127. Such account tokens can be obtained using the techniques described above. As a result, the account token databases 126, 127 may each store merchant specific account token sets 126(*a*), 127(*a*). For simplicity of illustration, account token databases 126, 127, as shown in FIG. 11, can store account tokens for each transaction. However, in other embodiments, additional information can be stored, such as a token derivation key index, and other transaction data, such as time of day, date, location, MVV, merchant category, etc.

FIG. 11 shows that account token database 126 may store account tokens for transactions T1-T3 wherein the three transactions involve only two unique account tokens: '12345', which is involved in two transactions; and '67890', which is involved in one transaction. In comparison, account token database 127 may also store account tokens for transactions T4-T6, wherein the three transactions also involve only two unique account tokens: 'ABCD', which is involved in two transactions; and 'BCDE', which is involved in one transaction. Thus, based on a comparison of merchant specific account tokens 126(*a*), 127(*a*), it would appear that transactions T1-T6 involve four account tokens (i.e., '12345', '6789', 'ABCD', and 'BCDE'), wherein two of the account tokens are each involved in two transactions (i.e., '12345' and 'ABCD'), and the remaining two account tokens are each involved in one transaction (i.e., '6789' and 'BCDE').

To enable the merchant support server 1102 to analyze the merchant specific account tokens 126(*a*), the merchants 120 may send message M1110A to the merchant support server 1102. Message M1110A can include the merchant verification value associated with merchant computer 120, one or more of the merchant specific account tokens 126(*a*), and any other transaction data. Message M1110A can be sent to the merchant support server 1102 in response to receiving an authorization response message from the payment processing network 140. Such may be the case when the merchant support server 1102 is involved in the authorization process. Alternatively, the merchant computer 120 may send message M1110A as part of a batch processes that runs periodically or at set times.

Similarly, merchant 121 can send message M1110B to the merchant support server 1102 to communicate its merchant specific account tokens 127(*a*) to the merchant support server 1102.

When the merchant support server 1102 receives messages M1110A and/or M1110B, the merchant support server 1102 may send a normalization request message M1112 to the tokenization server 220. FIG. 11 shows that the normalization request message M1112 can include multiple verification values. For example, the normalization request message M1112 can include a verification value associated with the merchant support server 1102 (e.g., SSVV). The tokenization server 220 can use the verification value associated with the merchant support system 1102 to identify the requester of the normalization request. Further, FIG. 11 shows that the normalization request message M1112 can include a merchant verification value associated with a merchant (e.g., MVV1 or MVV2) and merchant specific account tokens.

Once the tokenization server 220 receives the normalization request message M1112, the tokenization server 220 can authorize the request to normalize the account token. In one embodiment, prior to sending message M1110A, merchant 120 can register the merchant support server 1102 as a trusted support system. In this case, the tokenization server 220 can store this relationship in the support system database 246. Accordingly, in one embodiment, the tokenization server 220 can search the support system database 246 using the merchant verification value assigned to the merchant to determine whether the merchant previously registered the merchant support server 1102 as a trusted support system. Alternatively, in another embodiment, the tokenization server 220 can search the support system database 246 using the verification value of the merchant support server 1102 to determine whether the merchant previously registered the merchant support server as a trusted support system.

After the tokenization server 220 determines that the merchant support server 1102 is authorized to normalize the account token data, the tokenization server 220 can reverse tokenize the merchant specific account tokens to obtain the account identifier. In an example embodiment, the normalization module 228 (see FIG. 2) can normalize the account tokens. For example, with regard to merchant 120, the normalization module 228 can use the merchant verification value of the merchant 120 (e.g., MVV1) to search the TDK database 244 to find the token derivation key associated with merchant 120. Once the appropriate token derivation key is located, the normalization module 228 can then reverse tokenize the account token using the token derivation key assigned to merchant 120. This process is appropriate for those embodiments that use symmetric derivation keys. For embodiments that use asymmetric derivation keys, the TDK database 244 may store a token reverse key, which is similarly associated with the merchant verification value. Accordingly, rather than reverse tokenizing the account token with the token derivation key, the normalization module 228 can reverse tokenize the account token into the account identifier with the token reverse key. Whether a token derivation key is symmetric or asymmetric, a token derivation key index may also be required to reverse tokenize the account token.

The above described approach can be used with respect to any other merchant, such as merchant 121, and the other merchant's account tokens.

Once the normalization module 228 transforms the account tokens back to the underlying account identifiers, the normalization module 228 then searches the TDK database 244 for the token derivation key assigned to the merchant support system 1102. With the token derivation key assigned to the merchant support system 1102, the normalization module 228 can then generate new account tokens of the account identifiers. This new set of account tokens can be referred to as normalized account tokens.

After the normalization module 228 generates the normalized account tokens, the tokenization server 220 then sends the normalized account tokens to the merchant support server 1102. This is shown as message M1114, as a normalization response message. The merchant support server 1102 can store the normalized account tokens in the normalized account token database 1104. As shown in FIG. 11, the normalized account token database 1104 stores normalized account tokens 1104(a) that correspond to the six transactions in the merchant account token databases 126, 127. However, rather than linking the six transaction with the merchant specific account token (e.g., 126(a) and 127(a)), the transactions are linked to the normalized account tokens 1104(a).

As FIG. 11 shows, the normalized account tokens 1104(a) provides additional insight into the six transactions conducted by merchants 120, 121. For example, as described above, a comparison of merchant specific account tokens 126(a), 127(a) does not indicate that transactions 1 and 4 were conducted with the same account identifier because the respective account tokens differ (e.g., '12345' and 'ABCD', respectively). However, based on the normalized account tokens 1104(a), it is clear that transaction 1 and transaction 4 were conducted with the same account identifier because both transactions involve the same normalized account token, (i.e., 54321'). Further, after normalization, the normalized account tokens 1104(a) stored in the normalized account token database 1104 indicate that the six transactions are actually conducted with only two different account identifiers.

The normalization approach described above provides a number of additional advantages. For example, because systems external to the payment processing network store account tokens rather than account identifiers, these systems do not have to provide costly safety systems to ensure they comply with various security standards. In particular, the merchant support server 1102 can be completely shielded from receiving or even communicating account identifiers.

The approach described with respect to FIG. 11 may be well suited for situations that involve batch processing. For example, the merchant support system 1102 may provide a rewards program across merchants. As such, its support function may be run nightly, weekly, monthly, etc. However, because the technique described in context with FIG. 11 involves additional messages communicated between a merchant support system 1102 and the tokenization server 220, such an approach may not be appropriate if the merchant needs a real time response, such as a fraud alert.

FIG. 12 is a block diagram that shows an alternative approach for normalizing merchant specific account tokens to allow a merchant support server 1102 to compare account tokens across multiple merchants. Compared to system 1100, the system 1200 shown in FIG. 12 may be better suited for real time analysis offered by the merchant support server 1102.

In some embodiments, before the tokenization server 220 can provide a normalized account token for account identifiers involved in transactions with merchant 120, merchant 120 may enroll the merchant support server 1102 as a support system of merchant 120. This is shown as message M1210A. Message M1210A can include the merchant verification value of the merchant 120 and a support system verification value for the merchant support server 1102. For example, merchant 120 may be assigned the merchant verification value 'MVV1' and the third party support system 1102 can be assigned the support system verification value 'SSVV'. When a merchant enrolls a merchant support server as a service system of the merchant, the tokenization server 220 creates an association between the verification value of the merchant and the verification value of the merchant support server 1102. As shown in FIG. 12, record 1204 of normalization database 1207 may link various information used to tokenize account identifiers for merchant computer 120. For example, the merchant verification value (e.g., 'MVV1') assigned to the merchant computer 120 can be linked to token derivation key (e.g., 'Key A') assigned to merchant 120. Further, after enrolling the merchant support server 1102 as a support system of the merchant 120, the record 1204 may include a support system verification value (e.g., 'SSVV') assigned to the merchant support server 1102.

The record 1205 may include various information used to transform the account identifiers into a normalized account token. For example, the support system verification value (e.g., SSVV) can be linked to a token derivation key (e.g., Key C) that is used to tokenize account identifiers in a format specific to the merchant support server 1102. Records 1204, 1205 can be indexed by any suitable field, such as merchant or support system verification value.

Although FIG. 12 shows database 1207 storing the associations between the merchant verification values, support system verification values, and token derivation keys, it is to be appreciated that any combination of the databases 242, 244, and 246 (see FIG. 2) can be used to store such information.

Merchant 121 can enroll the merchant support server 1102 as a support system in a similar manner.

Once the merchant support server 1102 is enrolled as a support system for the merchants, merchant 120 can send an authorization request message to the tokenization server 220 in the typical fashion, as may occur when a consumer swipes their credit card at a POS terminal. This is shown as message M1212A. The authorization request message can include information shown in FIG. 4. For example, the authorization request message may include the merchant verification value assigned to merchant 120 and an account identifier. Upon receiving the authorization request message M1212A, the tokenization server 220 can process the transaction as described above. That is, the authorization request M1212A can be received by the authorization request module 230. The authorization request module 230 can then forward the authorization request message to the issuer computer 160 of the portable consumer device 115. In parallel, while the authorization request message is received by the authorization processing module 230, the tokenization module 226 can receive the account identifier and merchant verification value stored in the authorization request message. Using the merchant verification value, the tokenization module 226 may identify the token derivation key assigned to the merchant and then generates an account token using the token derivation key.

Additionally, the tokenization module 220 can use the merchant verification value to determine that the merchant support server 1102 is enrolled as a support system for the merchant 120. For example, the normalization module 228 can use the merchant verification value sent in the authorization request message to search database 1207 for a record associated with the merchant. For example, record 1204 can be indexed by the merchant verification value, in which case the normalization module would match record 1204 with the merchant verification value 'MVV1' sent in the authorization request message. The normalization module 228 can then search record 1204 for an indication that the merchant has enrolled merchant support server 1102 as a support system. FIG. 12 shows that record 1204 includes the support system verification value assigned to the merchant support server 1102 (i.e., SSVV). As described above, this indicates that the merchant 120 has enrolled the merchant support server 1102 as a support system.

After determining that the merchant support server 1102 is a support system for merchant computer 120, the tokenization module 226 can generate an additional account token using the token derivation key assigned to the merchant support server. This can be done by passing the support system verification value assigned to the merchant support server 1102 and the account identifier sent in the authorization request message to the tokenization module 226. When the tokenization module 226 receives the account identifier and the support system verification value 'SSVV', it can search normalization database 1207 for the token derivation key assigned to the merchant support server 1102. For example, the tokenization module 226 can obtain the token derivation key assigned to the support system by matching record 1205 with the support system verification value stored in record 1204 (i.e., 'SSVV'), for example. After the tokenization module 226 locates the record associated with the merchant support server 1102, the tokenization module 226 can generate a second account token of the account identifier sent in the authorization request message using the token derivation key assigned to the merchant support server 1104.

After the tokenization module 226 generates the account token based on the token derivation key assigned to the merchant 120 and the account token based on the token derivation key assigned to the merchant support server, the tokenization server 220 can send the account tokens to the merchant 120. This is shown as message M1214A. For example, as explained above, the account token based on the merchant's 120 token derivation key can be inserted in an authorization response message. Further, the account token based on the token derivation key assigned to the merchant support server 1104 can similarly be inserted in the authorization response message.

When the merchant 120 receives the authorization response message M1214A, the merchant can then store the account token based on the token derivation key assigned to the merchant in token database 126. FIG. 12 shows that account token database 126 stores the account tokens for transactions T1-T3. In addition to storing the account token based on the token derivation key assigned to the merchant 120, the merchant 120 can also send the account token based on the token derivation key assigned to the merchant support server 1104 to the merchant support server for further processing. For example, the merchant support server 1104 can be configured to assign a risk score to a transaction. In this way, message 1216A can be part of an authorization process used by the merchant 120.

The techniques described above can be used by the merchant 121. For example, merchant 121 can: register the merchant support server 1104 as a support system (M1210B); send an authorization request message (M1212B), receive an authorization response message that includes an account token based on the token derivation key assigned to merchant 121 and a key based on the token derivation key assigned to the merchant support server (M1214B), store the account token based on the token derivation key assigned to the merchant 121 (as shown by the merchant specific account tokens 127(*a*) stored in account token database 127), and send the account token based on the token derivation key assigned to the merchant support server 1104 (M1216B).

Further, the technique of generating account tokens in response to authorization request messages and sending the account tokens in authorization response messages can be repeated for one or more transactions. For example, as FIG. 12 shows, as was shown in FIG. 11, merchant 120 may store merchant specific account tokens 126(*a*) corresponding to three transactions, while merchant 121 may store merchant specific account tokens corresponding to three additional transactions. Similar to FIG. 11, collectively, the merchant specific account tokens 126(*a*), 126(*b*) provide relatively little information regarding the combined transactions. However, as shown in the merchant support server 1104, the normalized account tokens 1104(*a*) stored normalized database 1104 illustrate that transaction 1 and transaction 4 actually involve the same underlying account identifier.

However, unlike the embodiments described with reference to FIG. 11, embodiments according to FIG. 12 provide an improved technique for providing normalized account tokens if the normalization tokens are to be analyzed in real-time. Such is the case because the normalized account tokens are generated by the tokenization server when the tokenization server receives an authorization request message. As such, the normalized account tokens can be generated in parallel to the processing of the merchant specific account token and in parallel to the issuer processing the authorization request message.

VII. Exemplary Computer Apparatuses

Figure 8:
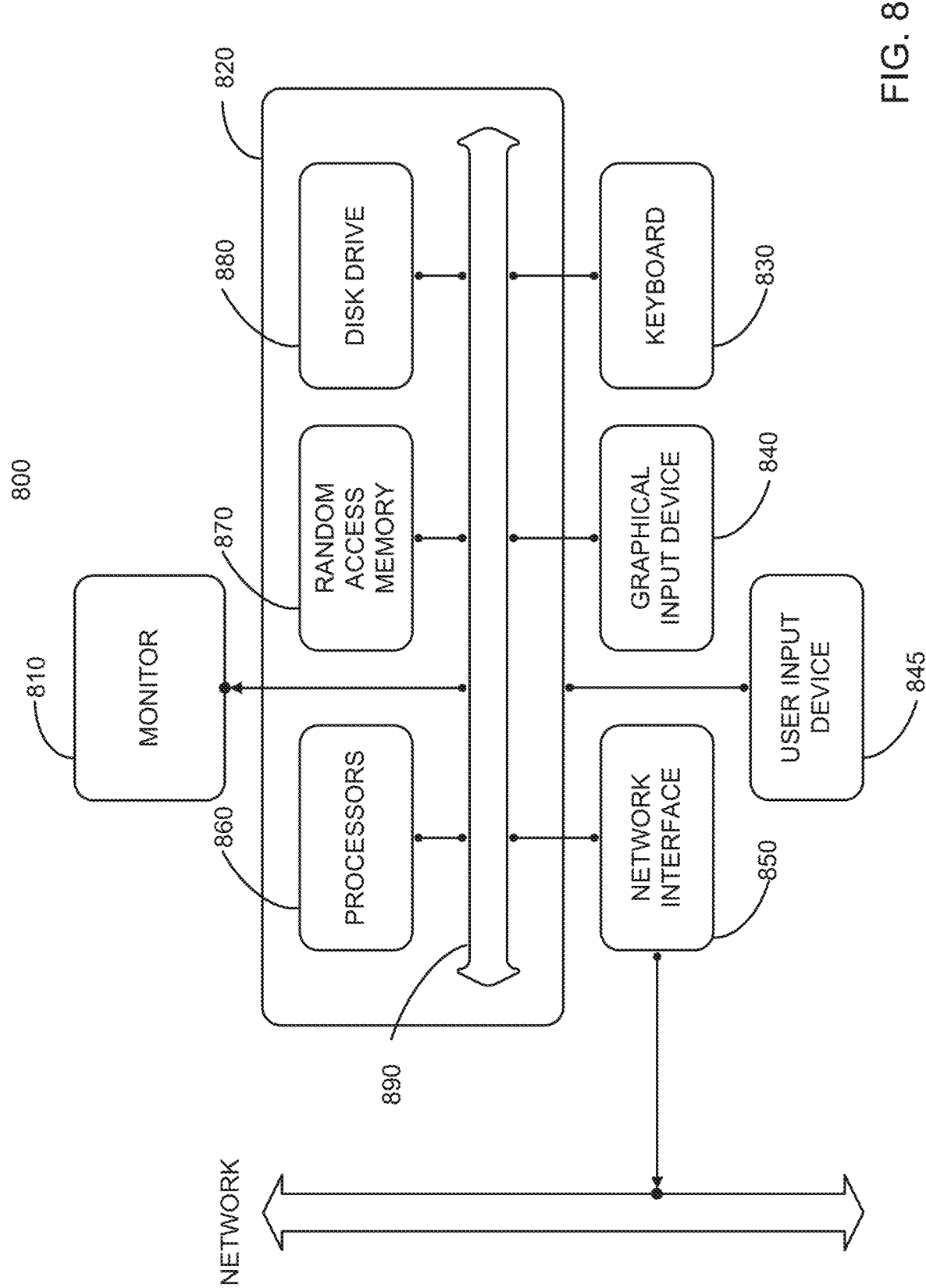
FIG. 8 is a block diagram illustrating the primary functional components of a computer or computing system that may be used to implement an element or component used in some embodiments of the present invention.

FIG. 8 shows a block diagram of an exemplary computer apparatus that can be used in some embodiments of the invention (e.g., in any of the components shown in the prior Figures).

Any of the elements in figures described herein can use any suitable number of subsystems to facilitate the functions described herein. System 800 in FIG. 8 is representative of a computer system capable of embodying various aspects of the present invention. The computer system can be present in any of the elements in figures described herein, including payment processing network 140, for example. Similarly, the various participants, entities and elements in FIG. 1 may operate one or more computer apparatuses to facilitate the functions described herein. It will be readily apparent to one of ordinary skill in the art that many other hardware and software configurations are suitable for use with the present invention.

For example, the computer may be a desktop, portable, rack-mounted or tablet configuration. Additionally, the computer may be a series of networked computers. Further, the use of other micro processors are contemplated, such as Xeon™ Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 800 typically includes a monitor 810, computer 820, a keyboard 830, a user input device 845, network interface 850, and the like. In various embodiments, monitor 810 may be embodied as a CRT display, an LCD display, a plasma display, a direct-projection or rear-projection DLP, a microdisplay, or the like. In various embodiments, display 810 may be used to display user interfaces and rendered images.

In various embodiments, user input device 845 is typically embodied as a computer mouse, a trackball, a track pad, a joystick, wireless remote, drawing tablet, voice command system, and the like. User input device 845 typically allows a user to select objects, icons, text and the like that appear on the display 810 via a command such as a click of a button or the like. An additional specialized user input device 845, such a magnetic stripe, RFID transceiver or smart card reader may also be provided in various embodiments. In other embodiments, user input device 845 include additional computer system displays (e.g. multiple monitors). Further user input device 845 may be implemented as one or more graphical user interfaces on such a display.

Embodiments of network interface 850 typically include an Ethernet card, a modem (telephone, satellite, cable, ISDN), (asynchronous) digital subscriber line (DSL) unit, FireWire interface, USB interface, and the like. For example, network interface 850 may be coupled to a computer network, to a FireWire bus, or the like. In other embodiments, network interface 850 may be physically integrated on the motherboard of computer, may be a software program, such as soft DSL, or the like.

RAM 870 and disk drive 880 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 820 typically includes familiar computer components such as a processor 860, and memory storage devices, such as a random access memory (RAM) 870, disk drive 880, and system bus 890 interconnecting the above components.

In some embodiments, computer 820 includes one or more Xeon™ microprocessors from Intel Corporation. Further, in the present embodiment, computer 820 may include a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such non-transitory computer readable medium may reside on or within a single computational apparatus, and may be present on or within different computational apparatuses within a system or network.

The above descriptions are illustrative and are not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. For example, any of the above described analytics may be combined with any other suitable analytics in any suitable manner in methods or systems according to embodiments of the invention. Thus, although specific features are separately described in this application, they may be combined in certain embodiments of the invention.

A recitation of "a", "an" or "the" is intended to mean "one or more" unless specifically indicated to the contrary.

What is claimed is:

1. A method comprising:
   receiving, by a tokenization server, a transaction authorization message including an account identifier, wherein the tokenization server is communicatively coupled to a first external entity computer of a first external entity and a second external entity computer of a second external entity for performing transaction support processes that supplement an authorization process in connection with the transaction authorization message;
   determining, by the tokenization server, that the first external entity computer is adapted to receive an account token in lieu of the account identifier whereas the second external entity computer is adapted to receive the account identifier;
   identifying, by the tokenization server, a unique token derivation key assigned to the first external entity computer, wherein the unique token derivation key is available only to the tokenization server;
   generating, by the tokenization server, the account token for the account identifier included in the transaction authorization message, generating comprising:
      encrypting the account identifier using the unique token derivation key for the first external entity computer to obtain the account token;
   transmitting, by the tokenization server, a first external transaction support request message with the account token to the first external entity computer for processing by the first external entity;
   transmitting, by the tokenization server, a second external transaction support request message with the account identifier to the second external entity computer for processing by the second external entity;
   receiving, by the tokenization server, a first external transaction support response message including the account token from the first external entity computer in response to the first external entity computer performing the transaction support process;
   receiving, by the tokenization server, a second external transaction support response message including the account identifier from the second external entity computer in response to the second external entity computer performing the transaction support process;
   sending, by the tokenization server, the transaction authorization message along with data from the first external transaction support response message or the second external transaction support response message to an issuer computer;
   receiving, by the tokenization server, a transaction response message from the issuer computer; and
   sending, by the tokenization server, the transaction response message along with data from the first external transaction support response message or the second external transaction support response message to a merchant computer.

2. The method of claim 1, wherein the transaction authorization message is a transaction authorization request message, the first external transaction support response message or the second external transaction support response message includes a fraud score, and the method further comprises:
   sending, by the tokenization server, the fraud score along with the transaction authorization message to the issuer computer.

3. The method of claim 1, further comprising, before generating the account token, determining, by the tokenization server, that an account token associated with the account identifier has not been generated.

4. The method of claim 1, further comprising:
   receiving, by the tokenization server from the first external entity computer and the second external entity computer, transaction support processing information about the first external entity computer and the second external entity computer during an enrollment process;
   storing, by the tokenization server, the transaction support processing information associated with the first external entity computer and the second external entity computer in a database.

5. The method of claim 4, wherein determining that the first external entity computer is adapted to receive the account token further comprises:
   looking up, by the tokenization server, the transaction support processing information associated with the first external entity computer from the database; and
   determining, by the tokenization server, that the first external entity computer is adapted to receive the account token in lieu of the account identifier based on the transaction support processing information about the first external entity.

6. The method of claim 1, wherein the first external entity computer or the second external entity computer includes a reporting system that generates reports of transaction histories based on a number of categories, and the method further comprises:
   sending the transaction response message along with the reports of transaction histories to the merchant computer.

7. A server computer comprising:
   a processor and
   a memory coupled to the processor, the memory storing instructions that, when executed by the processor, cause the processor to:
      receive a transaction authorization message including an account identifier, wherein the server computer is communicatively coupled to a first external entity computer of a first external entity and a second external entity computer of a second external entity for performing transaction support processes that supplement an authorization process in connection with the transaction authorization message;
      determine that the first external entity computer is adapted to receive an account token in lieu of the account identifier whereas the second external entity computer is adapted to receive the account identifier;

identify a unique token derivation key assigned to the first external entity computer, wherein the unique token derivation key is available only to the server computer;
generate the account token for the account identifier included in the transaction authorization message, wherein the instructions causing the processor to generate the account token further cause the processor to:
encrypt the account identifier using the unique token derivation key for the first external entity computer to obtain the account token;
transmit a first external transaction support request message with the account token to the first external entity computer for processing by the first external entity;
transmit a second external transaction support request message with the account identifier to the second external entity computer for processing by the second external entity;
receive a first external transaction support response message including the account token from the first external entity computer in response to the first external entity computer performing the transaction support process; and
receive a second external transaction support response message including the account identifier from the second external entity computer in response to the second external entity computer performing the transaction support process;
send the transaction authorization message along with data from the first external transaction support response message or the second external transaction support response message to an issuer computer;
receive a transaction response message from the issuer computer; and
send the transaction response message along with data from the first external transaction support response message or the second external transaction support response message to a merchant computer.

8. The server computer of claim 7, wherein the transaction authorization message is a transaction authorization request message, the first external transaction support response message or the second external transaction support response message includes a fraud score, and the instructions, when executed by the processor, further cause the processor to:
send the fraud score along with the transaction authorization message to the issuer computer.

9. The server computer of claim 7, wherein the instructions, when executed by the processor, further cause the processor to, before generating the account token, determine that an account token associated with the account identifier has not been generated.

10. The server computer of claim 7, wherein the first external entity computer or the second external entity computer includes a reporting system that generates reports of transaction histories based on a number of categories, and wherein the instructions, when executed by the processor, further cause the processor to send the transaction response message along with the reports of transaction histories to the merchant computer.

11. A non-transitory computer readable medium storing instructions that, when executed by a processor of a tokenization server, cause the processor to:
receive a transaction authorization message including an account identifier at a tokenization server, wherein the tokenization server is communicatively coupled to a first external entity computer of a first external entity and a second external entity computer of a second external entity for performing transaction support processes that supplement an authorization process in connection with the transaction authorization message;
determine that the first external entity computer is adapted to receive an account token in lieu of the account identifier whereas the second external entity computer is adapted to receive the account identifier;
identify a unique token derivation key assigned to the first external entity computer, wherein the unique token derivation key is available only to the tokenization server;
generate the account token for the account identifier included in the transaction authorization message, wherein the instructions causing the processor to generate the account token further cause the processor to:
encrypt the account identifier using the unique token derivation key for the first external entity computer to obtain the account token;
transmit a first external transaction support request message with the account token to the first external entity computer for processing by the first external entity;
transmit a second external transaction support request message with the account identifier to the second external entity computer for processing by the second external entity;
receive a first external transaction support response message including the account token from the first external entity computer in response to the first external entity computer performing the transaction support process;
receive a second external transaction support response message including the account identifier from the second external entity computer in response to the second external entity computer performing the transaction support process;
send the transaction authorization message along with data from the first external transaction support response message or the second external transaction support response message to an issuer computer;
receive a transaction response message from the issuer computer; and
send the transaction response message along with data from the first external transaction support response message or the second external transaction support response message to a merchant computer.

* * * * *